(12) United States Patent
Nguyen et al.

(10) Patent No.: US 7,950,996 B2
(45) Date of Patent: May 31, 2011

(54) METHODS AND DEVICES FOR GAMING ACCOUNT MANAGEMENT

(75) Inventors: Binh T. Nguyen, Reno, NV (US); Craig A. Paulsen, Reno, NV (US)

(73) Assignee: IGT, Reno, NV (US)

( * ) Notice: Subject to any disclaimer, the term of this patent is extended or adjusted under 35 U.S.C. 154(b) by 961 days.

(21) Appl. No.: 10/926,636

(22) Filed: Aug. 25, 2004

(65) Prior Publication Data

US 2005/0020354 A1    Jan. 27, 2005

Related U.S. Application Data

(63) Continuation-in-part of application No. 10/085,154, filed on Feb. 27, 2002, now Pat. No. 6,905,411.

(51) Int. Cl.
- *A63F 9/24* (2006.01)
- *A63F 13/00* (2006.01)
- *G06F 17/00* (2006.01)
- *G06F 19/00* (2006.01)

(52) U.S. Cl. ........... 463/25; 463/16; 463/17; 463/20; 463/40; 463/41; 463/42; 705/35; 235/381; 380/251

(58) Field of Classification Search ........... 463/25, 463/29

See application file for complete search history.

(56) References Cited

U.S. PATENT DOCUMENTS

| 4,385,285 A | 5/1983 | Horst et al. |
| 4,926,996 A | 5/1990 | Eglise et al. |
| 5,038,022 A | 8/1991 | Lucero |
| 5,056,141 A | 10/1991 | Dyke |
| 5,166,502 A | 11/1992 | Rendleman et al. |
| 5,179,517 A | 1/1993 | Sarbin et al. |
| 5,195,133 A | 3/1993 | Kapp et al. |
| 5,265,874 A | 11/1993 | Dickinson et al. |

(Continued)

FOREIGN PATENT DOCUMENTS

EP    0360613    9/1989

(Continued)

OTHER PUBLICATIONS

Second Advisory Office Action mailed May 28, 2007, for Russian Patent Application No. 2004126258/09 (028554) 11 pp.

(Continued)

*Primary Examiner* — Paul A. D'Agostino
(74) *Attorney, Agent, or Firm* — Weaver Austin Villeneuve and Sampson LLP

(57) ABSTRACT

Methods and devices are provided for managing gaming accounts. Some aspects of the invention provide for the cancellation, revocation or consolidation of cashless gaming instruments. For example, if a player has lost a cashless gaming instrument, the player could request that the cashless gaming instrument be cancelled. The request could be made in response to information (such as an activity log, an account statement, etc.) presented by a central network device. The information could be presented on a screen, printed on paper, etc. In order for such a request to be acted upon, it is preferable that the player, the gaming establishment that issued the cashless gaming instrument and the cashless gaming instrument itself be positively identified. Some implementations of the present invention provide for more flexible redemption in a cashless gaming system. Some such implementations allow a player to "cash out," preferably in a single transaction, after one or more gaming sessions. The gaming sessions may have been conducted at different gaming machines and/or at different casinos. Some implementations allow a player to cash out without a cashless gaming instrument.

22 Claims, 9 Drawing Sheets

U.S. PATENT DOCUMENTS

| | | | |
|---|---|---|---|
| 5,326,104 A | 7/1994 | Pease et al. | |
| 5,398,932 A * | 3/1995 | Eberhardt et al. | 463/29 |
| 5,470,079 A | 11/1995 | LeStrange et al. | |
| 5,498,859 A | 3/1996 | Farmont | |
| 5,505,449 A | 4/1996 | Eberhardt et al. | |
| 5,513,272 A | 4/1996 | Bogosian | |
| 5,605,506 A | 2/1997 | Hoorn | |
| 5,651,548 A | 7/1997 | French et al. | |
| 5,706,925 A | 1/1998 | Orus et al. | |
| 5,735,742 A | 4/1998 | French | |
| 5,761,647 A | 6/1998 | Boushy | |
| 5,762,552 A | 6/1998 | Vuong et al. | |
| 5,764,789 A | 6/1998 | Pare, Jr. et al. | |
| 5,795,226 A * | 8/1998 | Yi | 463/22 |
| 5,855,515 A | 1/1999 | Pease et al. | |
| 5,892,210 A | 4/1999 | Levasseur | |
| 5,895,321 A | 4/1999 | Gassies et al. | |
| 5,902,983 A | 5/1999 | Crevelt et al. | |
| 5,903,880 A * | 5/1999 | Biffar | 705/39 |
| 5,953,709 A * | 9/1999 | Gilbert et al. | 705/35 |
| 5,954,583 A | 9/1999 | Green | |
| 6,003,013 A | 12/1999 | Boushy | |
| 6,003,651 A | 12/1999 | Waller et al. | |
| 6,021,949 A | 2/2000 | Boiron | |
| 6,048,269 A * | 4/2000 | Burns et al. | 463/25 |
| 6,050,895 A | 4/2000 | Luciano, Jr. et al. | |
| 6,062,981 A | 5/2000 | Luciano, Jr. | |
| 6,099,408 A | 8/2000 | Schneier et al. | |
| 6,104,815 A | 8/2000 | Alcorn et al. | |
| 6,109,530 A | 8/2000 | Larson et al. | |
| 6,113,098 A | 9/2000 | Adams | |
| 6,148,094 A | 11/2000 | Kinsella | |
| 6,174,234 B1 * | 1/2001 | Seibert et al. | 463/20 |
| 6,183,362 B1 | 2/2001 | Boushy | |
| 6,186,895 B1 | 2/2001 | Oliver | |
| 6,193,152 B1 | 2/2001 | Fernando et al. | |
| 6,193,153 B1 | 2/2001 | Lambert | |
| 6,227,972 B1 | 5/2001 | Walker et al. | |
| 6,234,900 B1 | 5/2001 | Cumbers | |
| 6,240,396 B1 * | 5/2001 | Walker et al. | 705/26 |
| 6,264,109 B1 | 7/2001 | Chapet et al. | |
| 6,280,326 B1 * | 8/2001 | Saunders | 463/25 |
| 6,296,190 B1 | 10/2001 | Rendleman | |
| 6,330,162 B2 | 12/2001 | Sakamoto et al. | |
| 6,383,076 B1 | 5/2002 | Tiedeken | |
| 6,394,907 B1 | 5/2002 | Rowe | |
| 6,450,887 B1 * | 9/2002 | Mir et al. | 463/42 |
| 6,471,590 B2 | 10/2002 | Saunders | |
| 6,488,585 B1 | 12/2002 | Wells | |
| 6,500,067 B1 * | 12/2002 | Luciano et al. | 463/25 |
| 6,511,377 B1 | 1/2003 | Weiss | |
| 6,527,175 B1 * | 3/2003 | Dietz et al. | 235/381 |
| 6,547,664 B2 | 4/2003 | Saunders | |
| 6,554,704 B2 | 4/2003 | Nicastro | |
| 6,558,256 B1 | 5/2003 | Saunders | |
| 6,577,733 B1 * | 6/2003 | Charrin | 380/251 |
| 6,585,589 B2 | 7/2003 | Okuniewicz | |
| 6,607,441 B1 * | 8/2003 | Acres | 463/25 |
| 6,612,928 B1 | 9/2003 | Bradford et al. | |
| 6,629,019 B2 | 9/2003 | Legge | |
| 6,629,591 B1 | 10/2003 | Griswold | |
| 6,650,427 B2 * | 11/2003 | Brooks et al. | 358/1.12 |
| 6,652,380 B1 | 11/2003 | Luciano | |
| 6,671,358 B1 | 12/2003 | Seidman et al. | |
| 6,675,152 B1 | 1/2004 | Prasad et al. | |
| 6,679,775 B1 * | 1/2004 | Luciano et al. | 463/25 |
| 6,682,073 B2 | 1/2004 | Bryant | |
| 6,690,673 B1 | 2/2004 | Jarvis | |
| 6,709,333 B1 | 3/2004 | Bradford et al. | |
| 6,712,698 B2 | 3/2004 | Paulsen | |
| 6,722,985 B2 | 4/2004 | Criss-Puszkiewicz et al. | |
| 6,761,632 B2 | 7/2004 | Bansemer et al. | |
| 6,786,824 B2 | 9/2004 | Cannon | |
| 6,811,482 B2 | 11/2004 | Letovsky | |
| 6,852,031 B1 | 2/2005 | Rowe | |
| 6,866,586 B2 | 3/2005 | Oberberger | |
| 6,905,411 B2 | 6/2005 | Nguyen et al. | |
| 6,908,387 B2 | 6/2005 | Hedrick et al. | |
| 6,913,534 B2 | 7/2005 | DeFrees-Parrott | |
| 6,932,706 B1 | 8/2005 | Kaminkow | |
| 6,984,174 B2 | 1/2006 | Cannon | |
| 6,999,936 B2 | 2/2006 | Sehr | |
| 7,017,805 B2 | 3/2006 | Meehan | |
| 7,093,130 B1 * | 8/2006 | Kobayashi et al. | 713/176 |
| 7,174,277 B2 | 2/2007 | Vock | |
| 7,185,199 B2 | 2/2007 | Balfanz | |
| 2001/0018660 A1 * | 8/2001 | Sehr | 705/5 |
| 2002/0063622 A1 | 5/2002 | Armstrong | |
| 2002/0113124 A1 | 8/2002 | Meyerhofer et al. | |
| 2002/0114006 A1 | 8/2002 | Matoba | |
| 2002/0142825 A1 | 10/2002 | Lark et al. | |
| 2002/0147040 A1 | 10/2002 | Walker | |
| 2002/0151354 A1 | 10/2002 | Boesen | |
| 2002/0151359 A1 * | 10/2002 | Rowe | 463/29 |
| 2002/0173354 A1 | 11/2002 | Winans | |
| 2002/0181007 A1 | 12/2002 | Brooks et al. | |
| 2003/0027635 A1 * | 2/2003 | Walker et al. | 463/40 |
| 2003/0032474 A1 | 2/2003 | Kaminkow | |
| 2003/0036425 A1 | 2/2003 | Kaminkow | |
| 2003/0038176 A1 | 2/2003 | Dabrowski | |
| 2003/0054878 A1 | 3/2003 | Benoy et al. | |
| 2003/0065805 A1 | 4/2003 | Barnes | |
| 2003/0069057 A1 | 4/2003 | DeFrees-Parrott | |
| 2003/0069071 A1 * | 4/2003 | Britt et al. | 463/42 |
| 2003/0078094 A1 | 4/2003 | Gatto et al. | |
| 2003/0100371 A1 | 5/2003 | Gatto et al. | |
| 2003/0106769 A1 | 6/2003 | Weiss | |
| 2003/0119576 A1 | 6/2003 | McClintic | |
| 2003/0162591 A1 | 8/2003 | Nguyen et al. | |
| 2003/0171145 A1 | 9/2003 | Rowe | |
| 2003/0186739 A1 | 10/2003 | Paulsen | |
| 2003/0220138 A1 | 11/2003 | Walker | |
| 2003/0220835 A1 | 11/2003 | Barnes | |
| 2003/0228901 A1 | 12/2003 | Walker | |
| 2004/0030655 A1 | 2/2004 | Tanaka et al. | |
| 2004/0046642 A1 | 3/2004 | Becker | |
| 2004/0111369 A1 | 6/2004 | Lane | |
| 2004/0162130 A1 | 8/2004 | Walker | |
| 2004/0176157 A1 | 9/2004 | Walker | |
| 2004/0198490 A1 | 10/2004 | Bansemer | |
| 2004/0204215 A1 | 10/2004 | Meehan | |
| 2004/0219982 A1 | 11/2004 | Khoo | |
| 2004/0235552 A1 | 11/2004 | Gauselmann | |
| 2005/0009601 A1 | 1/2005 | Manfredi | |
| 2005/0014548 A1 | 1/2005 | Thomas | |
| 2005/0040934 A1 | 2/2005 | Shanton | |
| 2005/0085294 A1 | 4/2005 | Walker | |
| 2005/0107155 A1 | 5/2005 | Potts | |
| 2005/0107156 A1 | 5/2005 | Potts | |
| 2005/0124408 A1 | 6/2005 | Vlazny | |
| 2005/0153776 A1 | 7/2005 | LeMay | |
| 2005/0187020 A1 | 8/2005 | Amaitis | |
| 2005/0197190 A1 | 9/2005 | Amaitis | |
| 2005/0234769 A1 | 10/2005 | Jain | |
| 2005/0250578 A1 | 11/2005 | Slomiany | |
| 2005/0282606 A1 | 12/2005 | Fiden | |
| 2006/0046842 A1 | 3/2006 | Mattice | |

FOREIGN PATENT DOCUMENTS

| | | |
|---|---|---|
| EP | 1120757 A2 | 1/2001 |
| EP | 1120757 | 8/2001 |
| WO | WO94/10658 | 5/1994 |
| WO | WO94/16416 | 7/1994 |
| WO | WO99/19027 | 4/1999 |

OTHER PUBLICATIONS

Examiner's Communication pursuant to Article 96(2) EPC dated Jul. 11, 2007, from European Patent Application No. 03713830.2, Player Authentication for Cashless Gaming Machine Instruments, 4 pp.

International Search Report, dated Dec. 9, 2005 from corresponding International Application No. PCT/US2005/029660, including Notification of Transmittal, 5 pp.

Written Opinion of the International Searching Authority, dated Dec. 9, 2005 from corresponding International Application No. PCT/US2005/029660, 7 pp.

First Advisory Office Action mailed Dec. 4, 2006, for Russian Patent Application No. 2004126258/09 (028554) 11 pp.

Columbus, "Lessons Learned in Las Vegas: Loyalty Programs Pay," http://www.crmbuyer.com/story/45033.html, Jul. 29, 2005.

Pogash, "From Harvard Yard to Vegas Strip," Forbes.com, http://www.forbes.com/asap/2002/1007/048_print.html, Oct. 7, 2002.

Promo Magazine, "Harrah's Ups The Ante," http://promomagazine.com/othertactics/marketing_harrahs_ups_ante/.

Chen, "Harrah's Places Its CRM Bet," eweek Enterprise News & Reviews, http://www.eweek.com/article2/0,1895,1238689,00.asp, Apr. 2, 2001.

Lundquist, "Harrah's Bets on IT," eweek Enterprise News & Reviews, http://www.eweek.com/article2/0,1895,1828800,00.asp, Jun. 20, 2005.

Klugsberger, "What Made Harrahs an Innovation Leader?" GEMBA 2005, June $20^{th}$, 2005.

* cited by examiner

METHODS AND DEVICES FOR GAMING ACCOUNT MANAGEMENT

CROSS-REFERENCE TO RELATED APPLICATION

This application is a continuation-in-part of U.S. patent application Ser. No. 10/085,154 filed Feb. 27, 2002, now U.S. Pat. No. 6,905,411, entitled "Player Authentication for Cashless Gaming Machine Instruments," which is hereby incorporated by reference in its entirety.

BACKGROUND OF THE INVENTION

This invention relates to game playing services for gaming machines such as slot machines, video poker machines and bingo or pulltab machines. More particularly, the present invention relates to methods of authenticating cashless instruments, such as vouchers, in gaming machine systems.

There are a wide variety of associated devices that can be connected to a gaming machine such as a slot machine or video poker machine. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

As technology in the gaming industry progresses, the traditional method of dispensing coins or tokens as awards for winning game outcomes is being supplemented by ticket dispensers which print ticket vouchers that may be exchanged for cash or accepted as credit of indicia in other gaming machines for additional game play. An award ticket system, which allows award ticket vouchers to be dispensed and utilized by other gaming machines, increases the operational efficiency of maintaining a gaming machine and simplifies the player pay out process. An example of an award ticket system is the EZ PAY ticket system by International Game Technology (IGT) of Reno, Nev. Award ticket systems and systems using other cashless mediums are referred to as cashless systems.

Cashless systems, such as the EZ PAY ticket system, provide advantages to both game players and casino operators. For example, many players find it more convenient to carry an award ticket than a large number of coins. Cashless systems also tend to reduce gaming machine operating costs. For example, the infrastructure needed to remove and count indicia of credit (e.g. coins, tokens, bills) from the gaming machine may be eliminated or minimized when it is replaced with a cashless system, which reduces the gaming machine operating costs. Further, coin dust, which is potentially damaging to the components of the gaming machine (e.g. electronic components) may be eliminated or minimized when coin acceptors are replaced with the cashless system.

Currently, cashless systems have become very popular and have been embraced by customers. For example, ticket vouchers that are generated upon cash-out and redeemed for cash or gaming machine credits within a particular casino are well accepted by game players. Cashless gaming instruments, such as EZ PAY tickets, can be used for game play in a gaming machine or redeemed for cash.

However, a cashless gaming instrument is normally redeemable only at the gaming establishment that issued the cashless gaming instrument and typically has an expiration date. Moreover, a cashless gaming instrument may be used by anyone who has possession of the cashless gaming instrument, whether or not the rightful owner. If a player loses a cashless gaming instrument or does not redeem it at the same gaming establishment prior to the expiration date, the player loses the value of the cashless gaming instrument. If there were a way to add a security aspect to cashless gaming instruments to identify the owner, player trust and acceptability would be enhanced. Moreover, it would be desirable to offer players increased flexibility with regard to their control of cashless gaming instruments.

SUMMARY OF THE INVENTION

This invention addresses the needs indicated above by providing a gaming system and method designed or configured to provide security to cashless gaming instruments, such as EZ PAY ticket vouchers, by placing player authentication data, such as a signature, photo, biometric data, birth date, social security number, a PIN or password selected and entered by the player, or player identification data associated with a player tracking system operating on the gaming system, on the instrument. A player's authentication data may be acquired via an interface provided by a gaming machine and the data is then placed on cashless gaming instrument, such as a voucher, so that it may later be read and authenticated. Such vouchers could then only be negotiated by the person identified by or with knowledge of the player authentication data on the instrument.

The invention also provides methods and devices for managing gaming accounts. Such account management provides both flexibility and security. Some such aspects of the invention provide for the cancellation/revocation of tickets. For example, if a player has lost a cashless gaming instrument, the player could request that the cashless gaming instrument be cancelled. In some implementations, the player could make the request via a gaming machine. On other implementations, the player could make the request from a laptop, a hand-held device or some other convenient device. The request could be made in response to information (such as an activity log, an account statement, etc.) presented by a central network device. The information could be presented on a screen, printed on paper, etc. In order for such a request to be acted upon, it is preferable that both the player and the cashless gaming instrument be positively identified.

The gaming account management features of the present invention include many other features than those pertaining to ticket cancellation. For example, some implementations of the present invention provide for more flexible redemption in a cashless gaming system. Some such implementations allow a player to "cash out," preferably in a single transaction, after one or more gaming sessions. The gaming sessions may have been conducted at different gaming machines and/or at different casinos. The gaming sessions could include sessions played outside of a casino or similar gaming establishment. Some implementations allow a player to cash out without a cashless gaming instrument. Other implementations allow for the consolidation of gaming session results on a single cashless gaming instrument, such as a smart card.

Some aspects of the invention provide a method for providing gaming account services. The method includes the following steps: receiving identification information; determining whether a gaming account is associated with the identification information; providing gaming account information to a player when a gaming account is associated with the identification information, the gaming account information pertaining to a plurality of cashless gaming instruments; and enabling gaming account management options relating to the management of at least one previously issued cashless gaming instrument.

The gaming account management options may include the option of voiding a cashless gaming instrument, of replacing a cashless gaming instrument, of consolidating gaming account transactions, of consolidating a plurality of cashless gaming instruments, and/or of providing a gaming account summary. The gaming account summary may include information regarding recent gaming account transactions and/or gaming account activity during a specified time.

The option of replacing a cashless gaming instrument may involve crediting the gaming account for a value of the cashless gaming instrument or of printing a replacement cashless gaming instrument.

The receiving step may include receiving biometric identification information, casino identification information and/or a password. The determining step may involve accessing a lookup table or a database that includes gaming account information and identification information.

The step of enabling gaming account management options may be performed by a first gaming establishment and at least one cashless gaming instrument of the plurality of cashless gaming instruments may have been issued by a second gaming establishment. The step of enabling gaming account management options may include a step of redeeming at least one cashless gaming instrument that was issued by the second gaming establishment.

Alternative methods of controlling gaming accounts involve the following steps: receiving identification information from a player; identifying a cashless gaming instrument based, at least in part, on the identification information; and revoking the identified cashless gaming instrument, wherein the cashless gaming instrument is accepted as an indicium of credit for wagers on a game of chance and is redeemable for a cash value. The method may also include a step of providing a listing of cashless gaming instruments to the player, wherein the identification information received from the player comprises a selection of a cashless gaming instrument from the listing of cashless gaming instruments.

Some methods of providing gaming account services involve these steps: generating a plurality of cashless gaming instruments associated with a gaming account, each of the cashless gaming instruments accepted as an indicium of credit for wagers on a game of chance and redeemable for a cash value; accessing the gaming account; selecting two or more of the cashless gaming instruments; consolidating the two or more cashless gaming instruments to form a consolidated value; generating a new cashless gaming instrument having the consolidated value; and voiding the two or more cashless gaming instruments. Each of the cashless gaming instruments may have been generated at a different time after a cash out at a gaming machine. The method may also include the step of notifying a gaming account user when a cashless gaming instrument is within a predetermined time from expiration.

The method may include the step of allowing a gaming account user to convert a cashless gaming instrument to a promotion. The gaming account user may be allowed to print the promotion as a voucher. The cashless gaming instrument may be a printed ticket. The gaming account may be anonymous. The step of notifying a gaming account user may involve sending an email to the account user. The method may also include the step of offering the gaming account user a credit when the cashless gaming instrument is within a predetermined time from expiration. The credit may be for an amount less than a current value of the cashless gaming instrument. The credit may be offered for a fee.

The foregoing aspects and implementations of the invention may be embodied in software, in hardware (such as in gaming machines, cash out kiosks, or other machines) or otherwise, as set forth below. These and other features and advantages of the present invention are described below with reference to the drawings.

DETAILED DESCRIPTION OF SPECIFIC EMBODIMENTS

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

The present invention provides a gaming system and method designed or configured to provide security to cashless gaming instruments, such as EZ PAY ticket vouchers, by placing player authentication data, such as a signature, photo, biometric data, birth date, social security number, a PIN or password selected and entered by the player, or player identification data associated with a player tracking system operating on the gaming system, on the instrument. According to some implementations of the invention, a player's authentication data are acquired via an interface provided by a gaming machine and the data are then placed on cashless gaming instrument, such as a voucher, so that it may later be read and authenticated. Such vouchers could then only be negotiated (i.e., used for game play or redeemed for cash or other value (e.g., prizes)) by the person identified by or with knowledge of the player authentication data on the instrument.

Some aspects present invention may be implemented on a gaming machine. The gaming machine is typically one of several in a system of gaming machines and/or supporting devices interconnected via a host system as are known in the art. In one embodiment, the invention may be advantageously implemented in conjunction with a player tracking system. However, other aspects of the invention do not involve the use of a gaming machine. For example, some gaming account management methods of the invention may be implemented, at least in part, by a personal computer, a handheld device or another device. Such a device may be used to communicate with a network device that can access a database of gaming account information.

Figure 1:
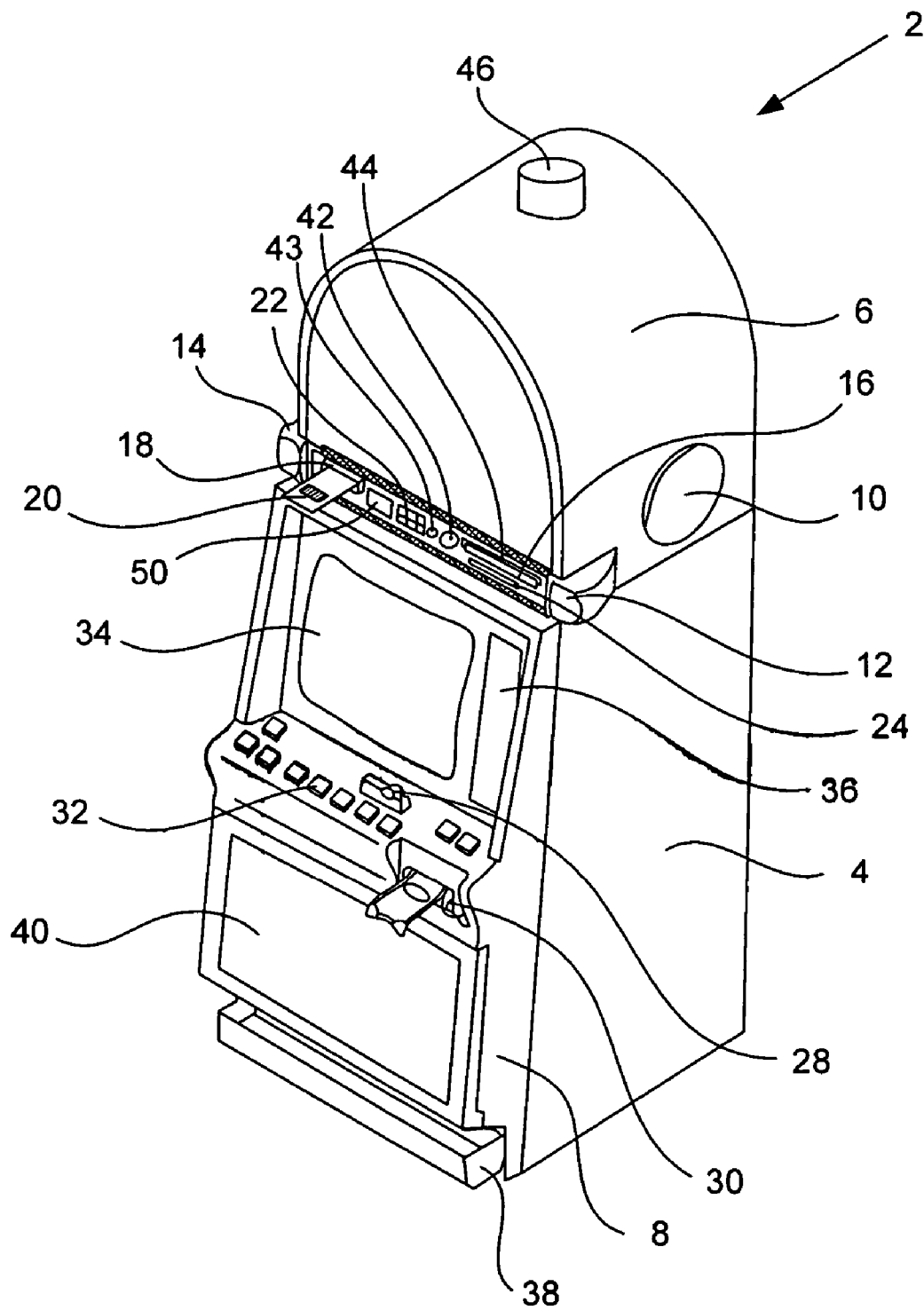
FIG. 1 is a perspective drawing of a gaming machine having a top box, player authentication data acquisition interfaces and other devices in accordance with the present invention.

FIG. 1 illustrates a video gaming machine suitable for some implementations of the present invention. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. In some embodiments, display monitor 34 is configured for "touch screen" functionality, thereby allowing input from a player in response to displayed information. The information panel 36 may be a back-lit, silk screened glass or plastic panel with lettering to indicate general game information including, for example, the number of coins played. The bill validator 30, player-input switches 32, video display monitor 34, and information panel are devices used, among other things, to play a game on the game machine 2. As described in more detail below, the display, input devices, etc., may also be used to perform (at least in part) the methods of the present invention. The devices are controlled by circuitry (see FIGS. 4A and 4B) housed inside the main cabinet 4 of the machine 2. Many possible games, including traditional slot games, video slot games, video poker, video black jack, video keno, video pachinko, lottery games and other games of chance as well as bonus games may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which may print bar-coded tickets 20 used as cashless instruments, and one or more player authentication data acquisition interfaces 50. In this regard it should be noted that player authentication data may be entered or acquired via an interface that is dedicated to the player authentication purpose, or, more preferably, one that is available to receive input for a variety of purposes including player tracking, wagering, etc. The machine 2 may also include a player tracking unit mounted within the top box 6. The player tracking unit includes a key pad 22 for entering player tracking information, a display 16 for displaying player tracking information, a card reader 24 for entering a magnetic striped card containing player tracking information, a microphone 43 for inputting voice data, a speaker 42 for projecting sounds and a light panel 44 for display various light patterns used to convey gaming information. A player playing a game on the gaming machine 2 or a person near the gaming machine may view the light patterns from the light panel 16. In other embodiments, the player tracking unit and associated player tracking interface devices, such as 16, 22, 24, 42, 43 and 44, may be mounted within the main cabinet 4 of the gaming machine, on top of the gaming machine, or on the side of the main cabinet of the gaming machine.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. Moreover, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present invention, as described below, can be deployed on virtually any gaming machine now available or hereafter developed.

Gaming machines of the present assignee are implemented with special features and/or additional circuitry that differentiates such gaming machines from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator of a gaming machine from manipulating hardware and software in a manner that gives them an unfair and some cases an illegal advantage. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog, since the operating system has presumably crashed or some other malfunction has occurred. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modem general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Each function of the game (bet, play, result, etc.) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, etc. This is critical to ensure the player's wager and credits are preserved. Typically, battery backed RAM devices are used to preserve this critical data. These memory devices are not used in typical general-purpose computers.

IGT gaming computers normally contain additional interfaces, including serial interfaces, to connect to specific subsystems internal and external to the slot machine. As noted above, some preferred embodiments of the present invention include parallel, digital interfaces for high-speed data transfer. However, even the serial devices may have electrical interface requirements that differ from the "standard" EIA-232 serial interfaces provided by general-purpose computers. These interfaces may include EIA-485, EIA-422, Fiber Optic Serial, Optically Coupled Serial Interfaces, current loop style serial interfaces, etc. The optically coupled interfaces prevent possible ESD damage to internal circuitry when the gaming machine is connected to third-party peripherals. Optical isolation also provides added security against unauthorized data sniffing devices.

IGT Gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Figure 2:
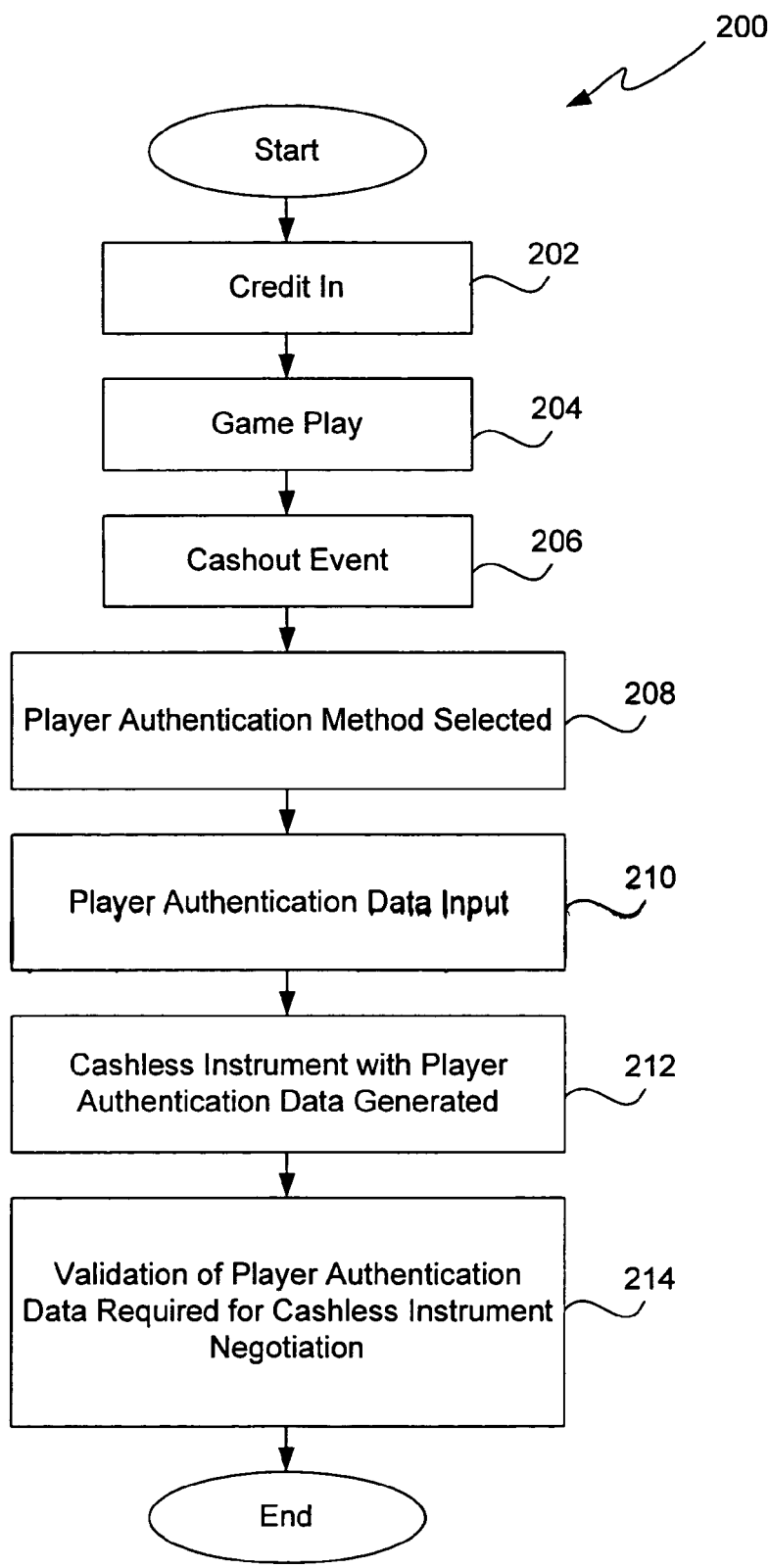
FIG. 2. is a flow chart depicting a method of providing player authentication for a cashless gaming instrument in accordance with the present invention.

FIG. 2. is a flow chart 200 depicting a method of providing player authentication data on a voucher in accordance with the present invention. At 202, a player adds credit to a gaming machine. Credit may be added by the player inserting cash through the machine's coin acceptor or bill validator. In addition, the player may use a cashless instrument of some type to register credits on the gaming machine. For example, the bill validator may accept a printed ticket voucher as an indicium of credit. As another example, the card reader 24 may accept a debit card, a smart card or a subscription card containing cash or credit information that may be used to register credits on the gaming machine. Credits can also be electronically transferred to or from an account previously established with the gaming establishment or with a financial institution such as a bank or a credit card company.

The cashless instrument typically contains information used to register credits on the gaming machine, and validate the registration transaction. For example, when a ticket voucher is used as a cashless instrument, the printed ticket voucher may contain information including: 1) a ticket value, 2) a ticket issue date, 3) a ticket issue time, 4) a ticket transaction number, 5) a machine ID, and 6) a ticket issue location. In addition, other types of information, besides the information listed above, may be stored on the cashless instrument. For example, the ticket may contain information regarding a bonus or a promotional prize that may be won by the player when the ticket voucher is utilized in the gaming machine 2. The promotional prize may involve multiple properties and particular types of gaming machines.

As described further below, in accordance with the present invention, the cashless instrument may also contain player authentication data placed on the instrument when it was generated, for example, on cashout from another gaming machine. In accordance with some embodiments of the present invention, the gaming machine devices accepting cashless gaming instruments to add credits to the machine, such as bill validators and card readers, may be configured, for example, by logic stored in a memory associated with the devices, to look for player authentication data on a cashless gaming instrument. Where the instrument is found to have player authentication data, the machine may prompt the player to validate the player authentication data on the instrument, for example, by providing a password, PIN, or personal or biometric data associated with the player authentication data on the instrument via an interface provided on the machine, such as a keypad, touchscreen, scanner (e.g., in the bill validator, for scanning a piece of personal identification, such as a driver's license or library card), or biometric device, such as a fingerprint scanner, etc. Without such validation, credits may not be added to the machine from the instrument. Where no player authentication data is found, player validation would not be required for credits to be added from the instrument.

The information on the cashless instrument may be recorded on the cashless instrument when the cashless instrument is generated. For example, in the case of a ticket voucher, the generation of the voucher may refer to the actual printing of the voucher on paper or some other medium. A unique barcode may be printed on the voucher which may be read with a barcode scanner to obtain information from the voucher. The ticket voucher 20, may be printed from a printer 18. In the case of the smart card or debit card, the generation of the smart card or debit card refers to storing or encoding this information on the smart card or debit card. The generation of the debit card or smart card may occur when the smart card or debit card is inserted into the card reader 24 in the gaming machine 2 or at another site where smart cards or debit cards are issued. For example, smart cards or debit cards may be generated at ATM like terminals, at a cashier station when a player cashes out or prepaid smart cards or debits may be purchased within the gaming property (e.g. casino).

In embodiments where player tracking is offered, prior to beginning a game play session on the gaming machine, a player may insert a player tracking card into a card reader 24 on the machine 2 to initiate a player tracking session. In a player tracking session on the gaming machine, features of the player's game play during a game play session on the gaming machine, such as an amount wagered during the game play session, may be converted to player tracking points and stored in the player's player tracking account on a player tracking server to which the gaming machine is connected in a network. Later, accumulated player tracking points may be redeemed for rewards or "comps" for the player such as free meals or free rooms. Usually, the player tracking card inserted into the card reader contains at least player tracking account information including the players name and some personal information.

After inserting a player tracking card, the player may be visually prompted on the display screen 16 or aurally prompted using the speaker to enter identification information such as a personal identification number (PIN) using the key pad 22. Typically, the player tracking card may remain in the card reader 24 during the game play session. As another example, the gaming machine may transfer player tracking information from a portable wireless device worn by the player via a wireless interface device (not shown) on the gaming machine 2. An advantage of using a portable wireless device is that the transfer of player tracking information is automatic and the player does not have to remember to correctly insert a player tracking card into the gaming machine.

At 204, the player is involved in playing the game on the gaming machine. During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine. Certain player choices may be captured by player tracking software loaded in a memory inside of the gaming machine. For example, the rate at which a player plays a game or the amount a player bets on each game may be captured by the player tracking software.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 200 or, for example, from lights behind the belly glass 40.

FIG. 2 is intended to convey implementation of the invention during the normal course of operating a gaming machine, which includes game play. However, game play on the gaming machine is not essential to the method of the present invention. A player may add credits to a machine and subsequently decide not to play the game offered on the machine, but instead to cashout. In this case, player authentication of a cashless voucher generated by the machine on cashout may be obtained.

At 206, a cashout event occurs. This is typically initiated by a player pushing a cashout button on the machine after the player has completed a game. Among the options available for cashout, a cashless instrument may be generated at the gaming machine 2. The cashless instrument may be a printed ticket voucher, a smart card, debit card or other cashless medium. For example, the player may decide to cashout and may receive a voucher 20 from the printer 18, which may be used for further games, to redeem a cash prize, to obtain food, merchandise, services, promotions, etc. Alternatively (or in addition), funds may be transferred to an account maintained by a gaming establishment or a financial institution such as a bank or a credit card company. The player may view cashless instrument transaction information on the video display screen 34 or the player tracking display screen 16. For instance, when a player cashes out from the gaming machine, the value stored on the cashless instrument may be displayed using the video display 34. Additional cashless instrument transaction information, also referred to herein as "gaming account information" or the like, may also be displayed to the player during a cashout event and at other times. Moreover, some implementations of the invention allow the player to control his or her gaming account in other ways. Details of such implementations are described below.

The EZ PAY ticket voucher system (IGT, Reno, Nev.) is an example of a suitable cashless gaming system for implementation of the present invention. Further details of this cashless gaming system (and of other systems and methods that may advantageously be used in accordance with the invention) are provided in U.S. Pat. No. 6,394,907, filed Aug. 25, 2000, by Rowe, titled "Cashless Transaction Clearinghouse," which is incorporated herein in its entirety and for all purposes.

In accordance with the present invention, when cashout is done by generation of a cashless instrument, such as a voucher, the player may select a player authentication technique to add security information to the instrument to identify the owner, at 208. For example, the gaming machine may prompt the player to select a player authentication technique by an audible query via a speaker 12, 14 or a text query via one of the display screens 34 or 16. Each player authentication technique will have an associated player authentication data acquisition interface, for example 50, by which the player provides some authentication data to be printed on the voucher (or otherwise placed on a cashless gaming instrument). A wide variety of player authentication data acquisition interfaces are available for implementation of the present invention, several of which are described below.

Player authentication data can be entered manually using a PIN, birth date or other information for identity confirmation, via a keypad. As noted above, the keypad used may be one that is dedicated to the player authentication purpose, or, more preferably, one that is available to receive input for a variety of purposes including player tracking, wagering, etc. In a preferred embodiment, the keypad provided in many conventional player tracking units may be used as a player authentication data interface in this way. This numeric or alphanumeric data can be read, stored, processed, and/or encoded (e.g., converted to barcode), and/or encrypted for printing as a security aspect on a cashless voucher (or otherwise placed on a cashless gaming instrument) generated by the machine on cashout.

The handling of data input into a gaming machine by keypad and the printing of coded and/or uncoded data on cashless vouchers by the gaming machine is a well known technique. The present invention adds a security aspect to cashless gaming instruments via these mechanisms by additionally placing player authentication data on the cashless instrument. The player will be asked to verify the authentication data on the voucher in order to authenticate the redemption of the voucher for cash. For example, a cashier will electronically read encoded authentication data printed on a voucher and ask the person presenting the voucher for redemption to confirm the PIN, birth date, or other authentication data entered by keypad and printed (in code and/or encrypted) on the voucher.

Another player authentication data interface that may be used is a touchscreen. For example, display 34 may be equipped with touchscreen technology to allow the display to receive input as well as provide output. Details of the use of touchscreen technology in gaming machines suitable for the implementation of the present invention are provided in co-pending U.S. patent application Ser. No. 09/961,051, filed Sep. 20, 2001, by Paulsen, et al., titled "Game Service Interfaces for Player Tracking Touch Screen Display," incorporated by reference herein it its entirety and for all purposes. In one embodiment, a player could enter her signature using the machine touchscreen. The signature could be converted to a digital image by the gaming machine and then printed on a cashless voucher on cashout. This signature can then be compared to the player's previously entered digitally stored signature filed with the gaming machine operator (e.g., casino), or to the signature on the player's driver's license if there is no previously recorded signature, when the voucher is presented to a cashier for redemption.

Player authentication data may also be input via a conventional gaming machine component configured for the task by logic. For example, a machine's bill validator may be configured to scan a player identification card, such as a driver's license or library card. The data so acquired may be placed (e.g., the image of the ID card printed) on a cashless instrument for player authentication purposes.

Other interfaces for acquiring player authentication data for placing on a cashless gaming instrument (e.g., printing on a voucher) include various biometric devices, such as fingerprint scanners, iris scanners, digital cameras (for acquiring a picture for image comparison or ratiometric (feature recognition) analysis), and/or a microphone (to obtain a digital file (signature) of the player's voice containing unique voice characteristic data), which collect player authentication data. Details of the use of such biometric technology in gaming machines suitable for the implementation of the present invention are provided in co-pending U.S. patent application Ser. No. 09/921,489, filed Aug. 3, 2001, by Hedrick et al., and titled, "Player Tracking Communication Mechanisms in a Gaming Machine," which is incorporated by reference herein in its entirety and for all purposes. In addition, a description of a finger print reader as an identification device is provided in co-pending U.S. application Ser. No. 09/172,787, filed Oct. 14, 1998, by Wells, et al., titled "Gaming Device Identification Method and Apparatus," which is incorporated herein in its entirety and for all purposes. In each case, the appropriate biometric interface is incorporated into the gaming machine and available to collect player authentication data that is then digitized and/or encoded and placed on a cashless gaming instrument generated by the machine on cashout.

While several player authentication data acquisition interfaces and techniques have been described above, it should be understood that any data acquisition method and apparatus suitable for acquiring a player authentication data or other data suitable for player authentication and placing it on a cashless gaming instrument so that it may later be read and authenticated may be used consistent with the principles of this invention. Moreover, although in preferred embodiments the method of the invention are automated, alternative embodiments include participation by a human being, e.g., for part of the identification or authentication process. For example, a person may compare identification information on a cashless instrument (e.g., a player's photograph) with information provided by the player, the player's voice or appearance, etc.

Further, player authentication of vouchers in accordance with the present invention may be advantageously integrated with player tracking systems in a gaming machine. The use of player tracking unit components such as keypads and biometric devices to collect player authentication data have been described above. In addition, data from a player's player tracking card (name, picture, barcode data matrix, etc.) may be selected by the user to authenticate a voucher, or the player tracking data may automatically printed onto the voucher, for example, on cashout for this purpose. In this embodiment, the player is identified to the gaming machine and associated system at the start of the gaming session by insertion of a player tracking card. Player authentication data on the player tracking card may be sufficient for player authentication in accordance with the present invention and obviate the need to prompt the player to select a data acquisition technique at cashout. In other embodiments, biometric input devices may be used to supplement information read from a player tracking card. Details of player tracking technology in gaming machines suitable for the implementation of the present invention are provided in co-pending U.S. patent application Ser. No. 09/838,033, filed Apr. 19, 2001, by Criss-Puskiewicz, et al, titled "Universal Player Tracking System," which is incorporated herein in its entirety and for all purposes, co-pending U.S. patent application Ser. No. 09/642,192, filed Aug. 18, 2000, by LeMay, et al, titled "Gaming Machine Virtual Player Tracking Services," which is incorporated herein in its entirety and for all purposes, and co-pending U.S. patent application Ser. No. 09/921,489, previously incorporated by reference. The integration of player tracking and player authentication in accordance with the present invention has further advantages in allowing the unification of discrete databases and hardware, facilitating implementation on legacy machines with limited peripheral capacity, and allowing new game features based on a player's known player profile or play style.

It should be noted that, in accordance with some embodiments of the present invention, player authentication data may be anonymous. That is, the player authentication data placed on the cashless instrument may not identify the player as a particular person, thereby preserving the player's privacy.

For example, the player may input a password or PIN via a keypad on the machine as her player authentication data. This data may be placed on the instrument, generally in coded form, generated by the machine on cashout. Then, the player may validate and redeem the instrument for cash by providing the password or code to the kiosk or cashier to identify herself as the owner of the instrument, without revealing her personal identity. In alternative embodiments, biometric data may be recorded and played on the instrument. The player's anonymity may still be preserved if the biometric data are kept confidential and not used to identify a player by name.

Once the player authentication technique is selected, the player authentication data is input via the associated data acquisition interface, at 210. The data is read and, where appropriate, digitized, encoded, encrypted, and/or stored. For instance, the data acquisition interface may be used with appropriate biometric software (e.g., fingerprint, iris or voice recognition) executed by: a) a logic device on the player authentication or tracking unit, b) a master gaming controller in a gaming machine, or c) another intelligent device on the gaming system. The player authentication techniques of the present invention are typically implemented in a networked gaming system in which various gaming machines are in communication with a server providing centralized services such as accounting, player tracking, etc. In some case, the details of the player authentication the player authentication and other cashless instrument data (e.g., voucher value, time and place of issue, etc.) may be reported to the system for accounting, auditing or other purposes.

At 212, at cashout a cashless instrument (e.g., voucher) with the player authentication data placed (e.g., printed) on it is generated. The data may be in plain text, encoded (e.g., in barcode or other data form), or other graphic forms (e.g., digital images of a player's signature or likeness). In some cases, the player authentication data may be combined with other encoded data on conventional tickets. In other cases, the player authentication data is printed in a separate field on the voucher.

At 214, in order to negotiate the cashless instrument (i.e., redeem it for cash/prizes or use it for game play), validation of the player authentication data on the instrument is required (e.g., the instrument holder must match or provide the authentication data printed on the voucher in order to cash it). In addition, according to some embodiments of the invention, validation of the player authentication data on the instrument is required in order to use the instrument for game play.

Figure 3:
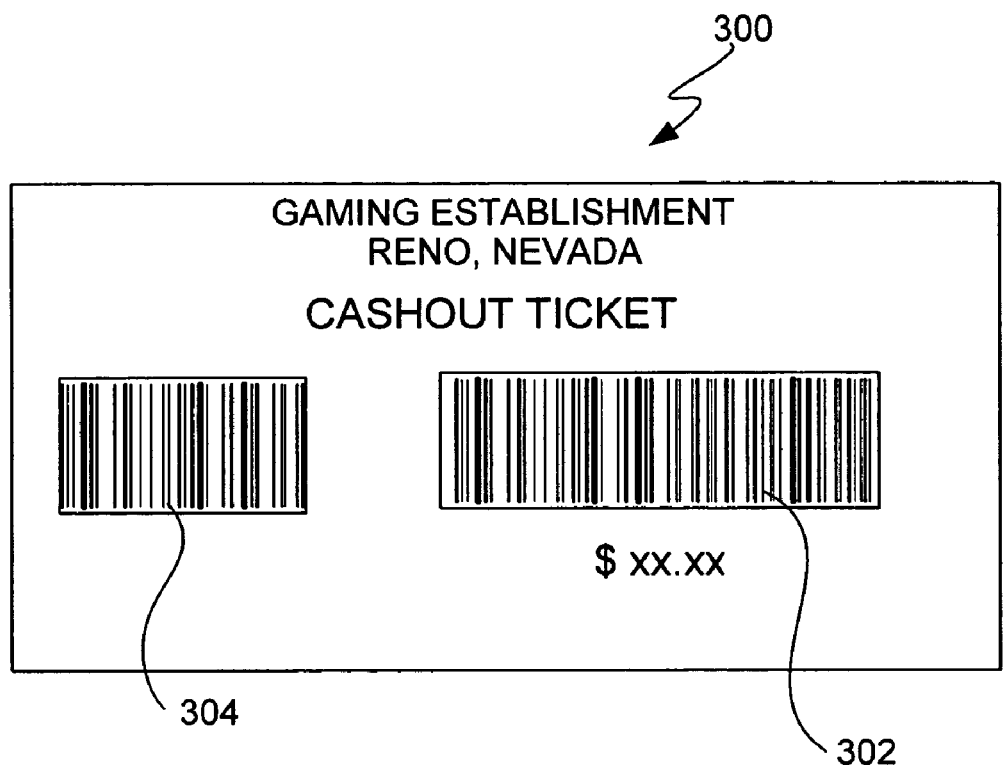
FIG. 3 is an illustration of a cashless gaming voucher with printed authentication data in accordance with one embodiment of the present invention.

FIG. 3 is an illustration of one type of cashless gaming instrument, a voucher with printed authentication data, in accordance with one embodiment of the present invention. The voucher 300 is an otherwise standard cashout ticket from a cashless gaming system, such as IGT's EZ PAY. The voucher includes machine-readable bar coding 302 providing data generally including the name and address of the issuing gaming establishment, the cash value of the voucher, etc. (see list above). The voucher also includes printed player authentication data generated through the player authentication system described above. In this example, the player authentication data is printed as barcode in a separate field 304. It should be understood that the invention is not limited to player authentication data printed as barcode as shown in this example. As described above, the player authentication data printed on a voucher (or otherwise stored on a cashless gaming instrument) may be in the form of the player's hand written signature, photograph, fingerprint, etc. These forms of player authentication data would not require encoding or encryption. When the voucher is presented to a cashier for redemption the player authentication data will be checked to verify that the person presenting the voucher for redemption is the rightful owner of the voucher.

The cashless instrument may serve various purposes. For example, the cashless instrument may indicate a primary award for a winning outcome on a primary game, a series of primary games, etc. Alternatively (or additionally), a cashless instrument may indicate a bonus award, an opportunity to play a secondary game (including but not limited to a bingo or pulltab game), credit for food, drinks, merchandise, services, promotions, etc. Co-pending U.S. patent application Ser. No. 10/114,006, filed Mar. 29, 2002 and entitled "Cashless Bonusing for Gaming Machines," is hereby incorporated by reference for all purposes. In one example noted therein, a cashless instrument may combine primary award information with identification information and bonusing information.

The information on a cashless instrument may be set forth on a single side of the cashless instrument or on both sides. Two-sided cashless instruments may be generated by a single-sided printer or a dual-sided printer. U.S. Pat. application Ser. No. 09/795,337, filed Feb. 27, 2001 and entitled "Thermal Printer with Dual Head-Audit Trail," is hereby incorporated by reference for all purposes.

It should also be understood that, while some aspects of the invention are described primarily herein with reference to the printing of player authentication data on a cashless voucher, these principles of the invention may also be applied to the placement of player authentication data on other cashless instrument media, such as a smart card. Details of smart card technology in gaming machines suitable for the implementation of the present invention are provided in co-pending U.S. patent application No. Ser. No. 09/718,974, filed Nov. 22, 2000 by Rowe, titled "EZ PAY SMART CARD AND TICKET SYSTEM," which is incorporated herein in its entirety and for all purposes.

Further, rather than generating a tangible instrument, such as a voucher or smart card, the gaming machine system may be configured to accept player instructions to have an electronic instrument ("virtual ticket"), wherein the instrument medium is an electronic data file and the player authentication data is stored in the file. The virtual ticket, including the instrument value and player authentication data may be transmitted to the user via a wired (e.g., Internet e-mail) or a wireless medium (e.g., pumped into a memory storage device such as a PDA, cell phone or memory stick) using communications protocols known in the art such as are noted below.

The player may then use this electronic instrument for game play or cash redemption, either in its electronic form in a gaming machine, kiosk or cashier's device configured to accept and read the data, for example using well known hardware interfaces and communications protocols. Alternatively, the player may convert the electronic instrument to a tangible instrument, such as by printing a voucher bearing the instrument value and player authentication data, or storing the electronic instrument data to a smart card, and then use that tangible instrument for game play or cash redemption.

Some implementations of the present invention allow for a player to access a gaming account, transfer funds, initiate game play, etc., by merely identifying himself or herself. The identifying step may involve some form of biometric identification (described in detail below), the entering or stating a password, identification by an employee of a gaming establishment, etc. For example, if the player has previously cashed out via a cashless instrument and has subsequently lost the cashless instrument, the player could identify herself, void the lost cashless instrument and obtain credit for the cashless instrument. Some such exemplary implementations will be described below with reference to FIGS. 6A and 6B.

Figure 4A:
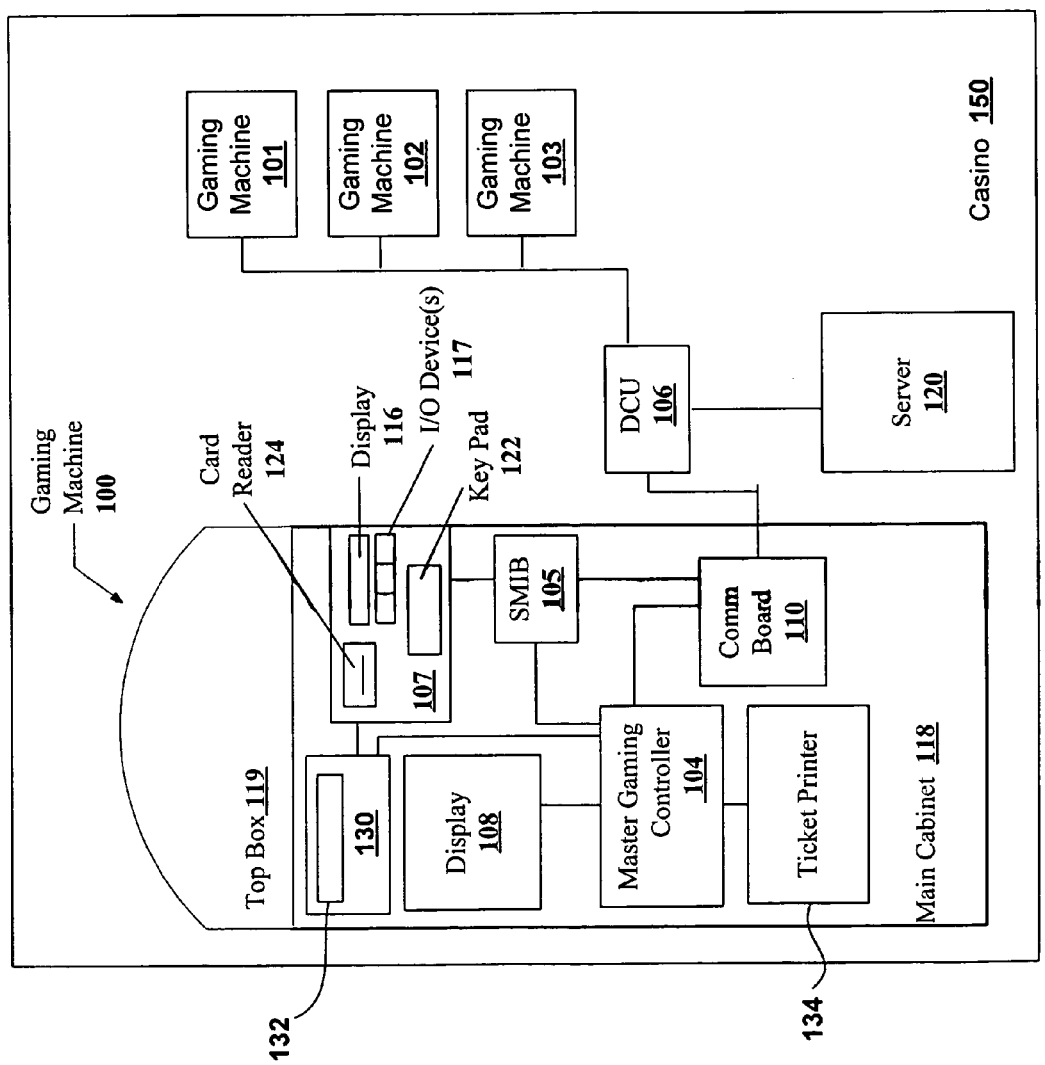
FIG. 4A is a block diagram illustrating elements of a system supporting player authentication for cashless gaming instruments in accordance with some implementations of the present invention.

A gaming machine suitable for implementation of the present invention is further described with reference to FIG. 4A. FIG. 4A is a block diagram of a number of gaming machines connected to servers providing associated services, such as accounting, player tracking and player authentication. In casino 150, gaming machines 100, 101, 102 and 103 are connected, via the data collection unit (DCU) 106 to a server 120. The DCU 106, which may be connected to up to 132 player tracking units as part of a local network in a particular example, consolidates the information gathered from player tracking and player authentication units in gaming machines 100, 101, 102 and 103 and forwards the information to the server 120. Among the functions of the server are 1) to store player tracking account information, such as information regarding a player's identity and previous game play, 2) to calculate player tracking points based on a player's game play that may be used as basis for providing rewards to the player, 3) store player authentication data for cashless instrument authentication, and 4) other marketing and promotional purposes.

In gaming machine 100 of casino 150, a master gaming controller 104 controls various combinations of devices that allow a player to play a game on the gaming machine and also encourage game play on the gaming machine, etc. It should be noted that in other embodiments, one or more other intelligent devices in a gaming system network may control one or more of the machine devices. The master gaming controller 104 is connected with a main, usually video, display 108, with a player authentication unit 130 and with player tracking unit 107 via a main communication board 110 and a slot machine interface board (SMIB) 105, all of which are mounted within a main cabinet 118 of the gaming machine. The machine also includes a ticket printer 134, interconnected as a peripheral with the other components of the gaming machine 100, which may print bar-coded tickets or vouchers. The printer may be a stand alone component, or may be part of one or more functional units of the machine 100, such as the player tracking unit 107 or the player authentication unit 130. The player authentication unit also includes one or more player authentication data acquisition devices 132. In the illustrated embodiment, the player authentication features of the present invention are depicted as being implemented as a discrete player authentication unit 130 interconnected as a peripheral with the other components of the gaming machine 100. The player authentication features may also be implemented as part of one or more other components of the machine, in particular the player tracking unit. When both are present, the player authentication unit 130 and the player tracking unit may be directly connected so that they may more easily share I/O devices and drivers and data. A top box 119 is mounted on top of the main cabinet 118 of the gaming machine. Player authentication and/or player tracking units may be mounted within the top box 119 or the cabinet 118, or may be mounted externally.

The player tracking unit 107 includes a variety of player tracking devices, including a card reader 124, a key pad 122, and a display 116, usually a vacuum fluorescent display (VFD) or liquid crystal display (LCD), all mounted within the unit. Other player tracking I/O devices may also be used, as represented by 117, for example, various biometric devices such as a digital camera, a microphone, or a fingerprint or iris scanner. As noted above, these player tracking devices may also be used to acquire player authentication data for use in a player authentication system in accordance with the present invention. The I/O devices are used to input player tracking information that is needed to implement the player tracking program and to acquire player data needed to implement the player authentication system. The player tracking unit 107 communicates with the server via the SMIB 105, a main communication board 110 and the data collection unit 106. The SMIB 105 allows the player tracking unit 107 to gather information from the gaming machine 100 such as an amount a player has wagered during a game play session. This information may be used by the player tracking server 120 to calculate player tracking points for the player. The player tracking 107 and player authentication units (whether two separate units or integrated as one) are usually connected to the master gaming controller 104 via a serial connection of some type and communicate with the master gaming controller 104 using a communication protocol of some type. For example, the master gaming controller 104 may employ the Slot Accounting System (SAS protocol) developed by International Game Technology of Reno, Nev. to communicate with the player tracking and authentication units.

The player authentication unit may include a logic device having a processor for executing software allowing the unit to perform various player authentication functions, such as communicating with the server 120 and/or other network devices (such as the network devices of central system 520, described below with reference to FIG. 5), communicating with the master gaming controller 104 and/or operating the various peripheral devices such as the authentication data acquisition device(s) 132 and the printer 134. In one embodiment, application software for the player authentication unit and configuration information for the player authentication unit may be stored in a memory device such as an EPROM, a non-volatile memory, hard drive or a flash memory.

The player authentication unit 130 may include a memory configured to store: 1) player authentication software such as player authentication data collection software, 2) player authentication communication protocols allowing the player authentication unit 130 to communicate with different types of servers (e.g., 120), 3) device drivers for many types of player authentication data acquisition devices (e.g. 132), 4) biometric (e.g., fingerprint, iris or voice recognition) software for acquiring and processing data from the device(s) 132, 5) a secondary memory storage device such as a non-volatile memory device, configured to store gaming software related information (The gaming software related information and memory may be used in a game download process or other software download process.), and 6) communication transport protocols such as TCP/IP, USB, IEEE1394, Bluetooth, IEEE 802.11x(e.g., all IEEE 802.11 standards), HiperLAN/2, and HomeRF allowing the player authentication 130 unit to communicate with devices using these protocols or communication protocols allowing the logic device to communicate with different types of master gaming controllers (e.g. master gaming controllers using different types of communication protocols), such as 104. Typically, the master gaming controller, such as 104, communicates using a serial communication protocol. A few examples of serial communication protocols that may be used to communicate with the master gaming controller include but are not limited to USB, RS-232 and Netplex (a proprietary protocol developed by IGT, Reno, Nev.).

A plurality of device drivers may be stored in memory for each type of player authentication data acquisition peripheral device. When one type of a particular peripheral device is exchanged for another type of the particular device, a new device driver may be loaded from the memory by the processor to allow communication with the device.

It should be noted from the above description that the player authentication unit may be conceptual in that its hardware components may be made up from other devices existing in conventional gaming machines configured by logic to perform the functions needed to implement the present invention, as would be understood by one of skill in the art from this disclosure.

Figure 4B:
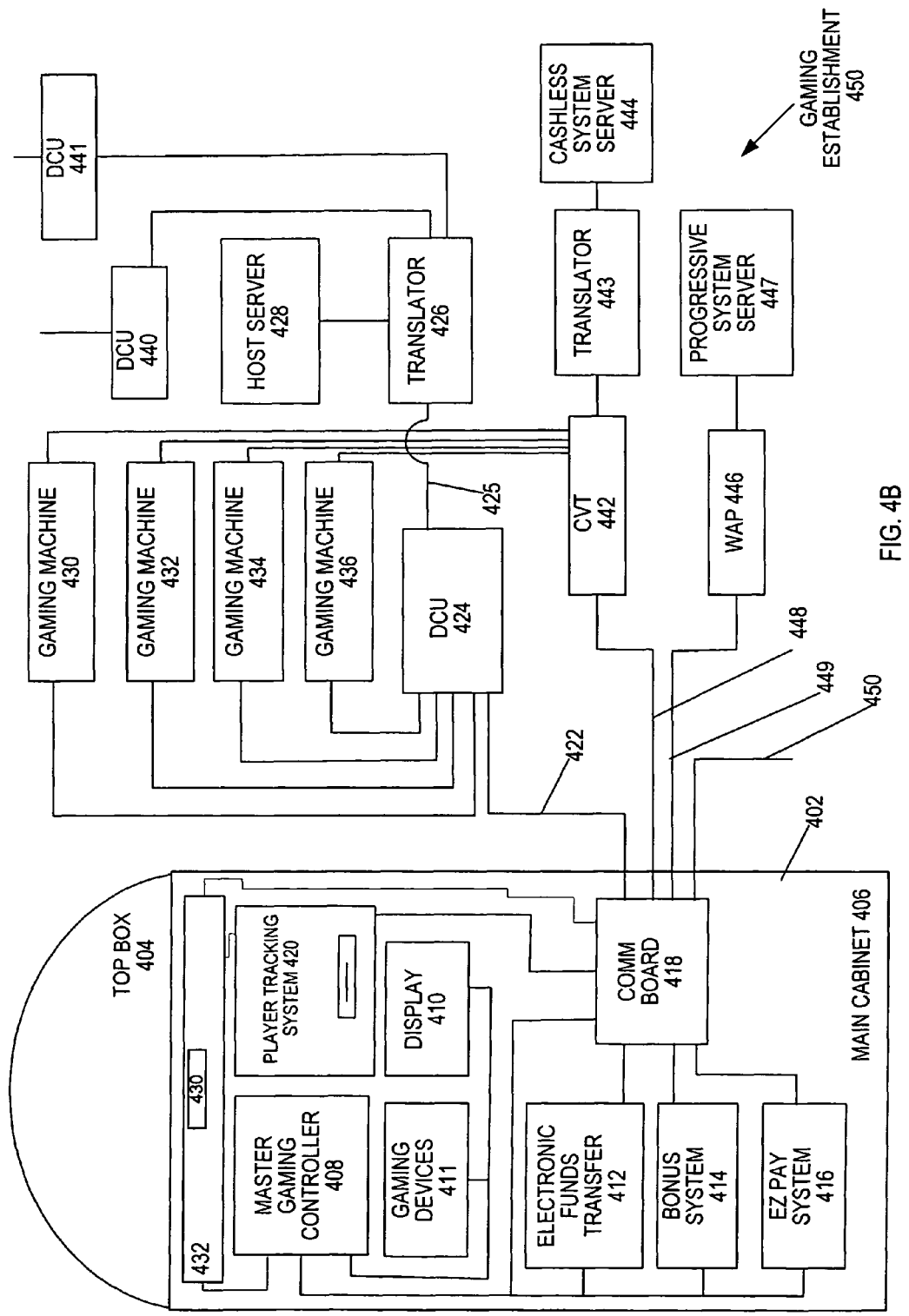
FIG. 4B is a block diagram illustrating elements of a system supporting player authentication for cashless gaming instruments in accordance with alternative implementations of the present invention.

FIG. 4B is a simplified block diagram depicting alternative embodiments of networked gaming machines within gaming establishment 401. The gaming machines are connected with a dedicated communication network via a host server and a DCU according to one embodiment of the invention. According to some embodiments of the invention, the DCU is an enhanced DCU as described in U.S. patent application Ser. No. 10/187,059, entitled "Redundant Gaming Network Mediation," which is hereby incorporated by reference in its entirety.

In FIG. 4B, gaming machine 402, and the other gaming machines 430, 432, 434, and 436, include a main cabinet 406 and a top box 404. The main cabinet 406 houses the main gaming elements and can also house peripheral systems, such as those that utilize dedicated gaming networks. The top box 404 may also be used to house these peripheral systems.

The master gaming controller 408 controls the game play on the gaming machine 402 and receives or sends data to various input/output devices 411 on the gaming machine 402. The master gaming controller 408 may also communicate with a display 410.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 408 may also communicate with EFT system 412, bonus system 414, EZPay™ system 416 (a proprietary cashless ticketing system of the present assignee) or a comparable system, and player tracking system 420. The systems of the gaming machine 402 communicate the data onto the network 422 via a communication board 418.

According to some implementations, EFT system 412 allows funds to be transferred to and/or from gaming accounts that are managed by a gaming establishment. In other implementations, EFT system 412 allows funds to be transferred to and/or from gaming accounts that are managed by a separate financial institution (e.g., a bank or a credit card company) or another entity. Such implementations may use non-dedicated intermediate networks (for example, the Internet), e.g., as described below with reference to FIG. 5.

In the present illustration, the gaming machines 402, 430, 432, 434, and 436 are connected to a dedicated gaming network 422. In general, the DCU 424 functions as an intermediary between the different gaming machines on the network 422 and the host server 428. In general, the DCU 424 receives data transmitted from the gaming machines and sends the data to the host server 428 over a transmission path 426. In some instances, when the hardware or software interface used by the gaming machine is not compatible with the host server 428, a translator 425 may be used to convert data from the DCU 424 to a format accepted by the host server 428. The translator may provide this translation service to a plurality of DCUs, such as 424, 440 and 441.

Further, in some dedicated gaming networks, the DCU 424 can receive data transmitted from the host server 428 for communication to the gaming machines on the gaming network. The received data may be communicated synchronously to the gaming machines on the gaming network. Within a gaming establishment, the gaming machines 402, 430, 432, 434 and 436 are located on the gaming floor for player access while the host server 428 is usually located in another part of gaming establishment 401 (e.g. the backroom), or at another location.

In a gaming network, gaming machines, such as 402, 430, 432, 434 and 436, may be connected through multiple communication paths to a number of gaming devices that provide gaming services. For example, gaming machine 402 is connected to four communication paths, 422, 448, 449 and 450. As described above, communication path 422 allows the gaming machine 402 to send information to host server 428. Via communication path 448, the gaming machine 402 is connected to a clerk validation terminal 442. The clerk validation terminal 442 is connected to a translator 443 and a cashless system server 444 that are used to provide cashless gaming services to the gaming machine 402. Gaming machines 430, 432, 434 and 436 are also connected to the clerk validation terminal 442 and may also receive cashless system services.

Via communication path 449, the gaming machine 402 is connected to a wide area progressive (WAP) device 446. The WAP is connected to a progressive system server 447 that may be used to provide progressive gaming services to the gaming machines. The progressive game services enabled by the progressive game network increase the game playing capabilities of a particular gaming machine by enabling a larger jackpot than would be possible if the gaming machine was operating in a "stand alone" mode. Winning the game being played on a participating gaming machine gives a player a chance to win the progressive jackpot. The potential size of the jackpot increases as the number gaming machines connected in the progressive network is increased. The size of the jackpot tends to increase game play on gaming machines offering a progressive jackpot.

Gaming machines 430, 432, 434 and 436 may also be connected to WAP device 446 and progressive system server 447. Other gaming machines may also be connected to WAP device 446 and/or progressive system server 447. Via communication path 450, the gaming machine 402 may be connected with additional gaming devices (not shown) that provide other gaming services.

In some embodiments of the present invention, gaming machines and other devices in the gaming establishment depicted in FIG. 4B are connected to a central system and/or other gaming establishments via one or more networks, which may be public or private networks. For example, host server 428 and/or progressive system server 447 may be connected to an outside network, such as a network described below with reference to FIG. 5. In other embodiments, a bingo server, a switch, or another type of network device may be part of an interface with an outside network.

Figure 5:
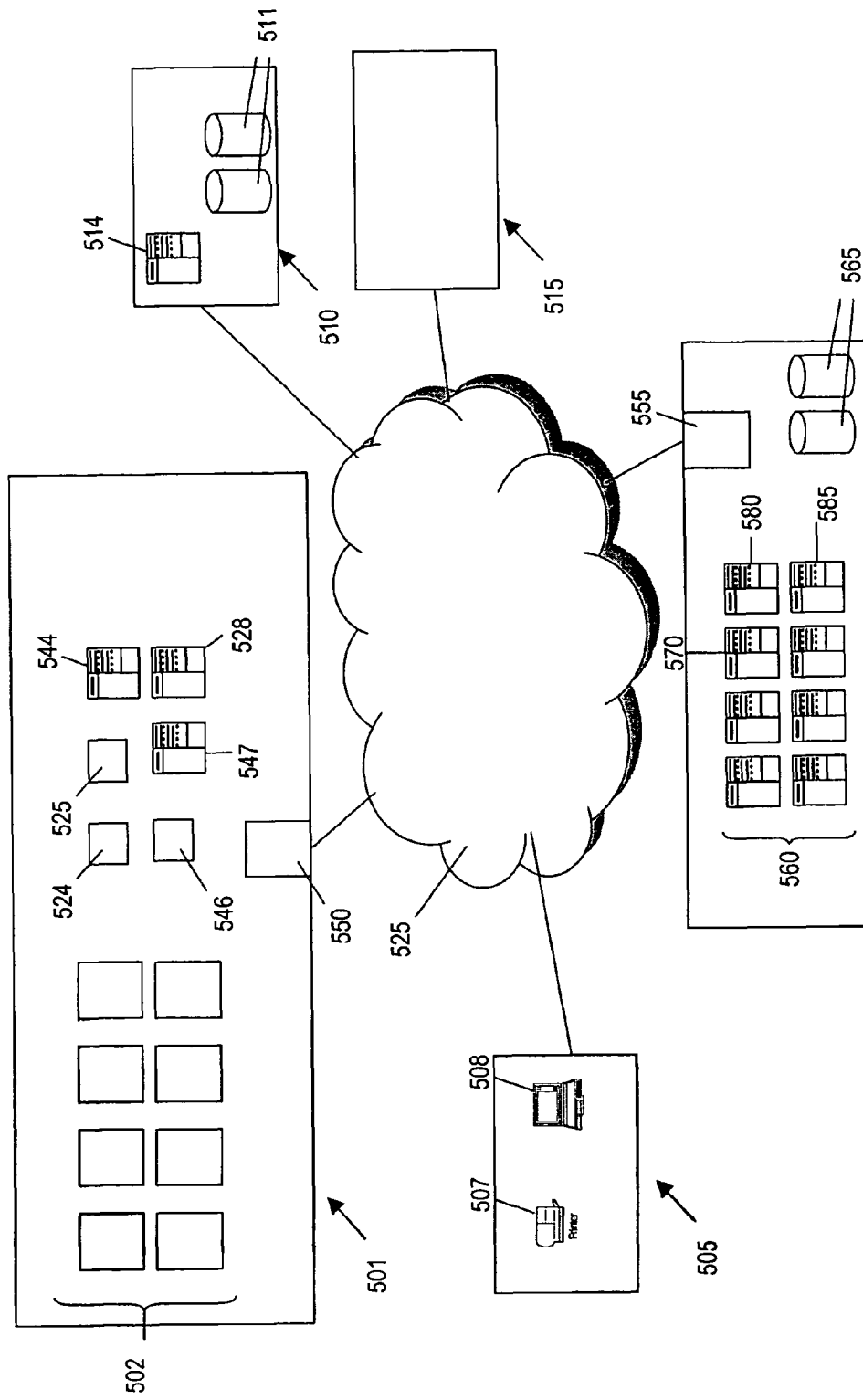
FIG. 5 illustrates a network that may be used for gaming account management according to some implementations of the invention.

FIG. 5 is a simplified network diagram that illustrates a plurality of gaming establishments, a financial institution and an exemplary home network connected to a central system. In this example, controlled gaming establishments 501 and 515, home network 505 and financial institution 510 are connected to central system 520 via network 525. As used herein, a "controlled" gaming establishment means a gaming establishment having a controlled environment such as a casino, a card room or a similar gaming establishment. Offering games of chance in controlled environments allows gaming establishment employees to verify a player's identity, age, etc.

However, in recent years, a number of gaming establishments have begun providing some games of chance to users who are located in "uncontrolled" environments, such as the user's home, a hotel room, etc. One such uncontrolled environment is home network 505. Gaming establishments that offer games of chance to users who are located in uncontrolled environments will be referred to herein as "Internet casinos," although those of skill in the art will realize that Internet casinos are not casinos in a traditional sense and that Internet casinos may be accessed via networks other than the Internet. Typically, Internet casinos are groups of network devices (e.g., servers) that are configured to conduct games of chance, such as blackjack, video poker, etc., by interacting with a host device. This process will be referred to herein as "Internet gaming." The host device may be a gaming kiosk, a personal computer, a personal digital assistant, a cellular telephone, or another such host device. Co-pending U.S. application Ser. No. 10/981,435, entitled "Location And User Identification For Online Gaming," which is hereby incorporated by reference in its entirety, describes devices and methods for Internet gaming.

Those of skill in the art will realize that more or fewer controlled and uncontrolled gaming environments, financial institutions and other devices, entities and/or networks or may be in communication with central system 520. Moreover, although central system 520 is depicted as having a single location, in alternate embodiments of the invention the devices that constitute central system 520 are in two or more locations.

In this example, network 525 is the Internet. However, it will be understood by those of skill in the art that network 525 could be any one of various other types of networks, such as the PSTN, a satellite network, a wireless network, a metro optical transport, etc. Accordingly, a variety of protocols may be used for communication on network 525, such as Internet Protocol ("IP"), Fibre Channel ("FC"), FC over IP ("FCIP"), Internet SCSI ("iSCSI," an IP-based standard for linking data storage devices over a network and transferring data by carrying SCSI commands over IP networks) or Dense Wavelength Division Multiplexing ("DWDM," an optical technology used to increase bandwidth over existing fiber optic backbones).

To transfer data in a secure manner, data transmitted over network 525 may be encrypted. In one embodiment of the present invention, an asymmetric encryption scheme incorporating a public-private encryption key pair may be used. Information encrypted with the private encryption key may be decrypted only using the corresponding public encryption key of the public-private encryption key pair and information encrypted with the public encryption key may be decrypted only using the private encryption key of the public-private encryption key pair. Thus, an entity with a private encryption key of public-private encryption key pair may give its public encryption key to many other entities. The public key may be made available (via an Internet server, e-mail, or some other means) to whomever needs or wants it. The private key, on the other hand, is kept secret. Only the owner of the key pair is allowed to possess the private key. The other entities may use the public encryption key to encrypt data. However, as long as the private encryption key remains private, only the entity with the private encryption key can decrypt information encrypted with the public encryption key.

In general, public-key encryption algorithms are very slow and it is impractical to use them to encrypt large amounts of data. In practice, symmetric algorithms are used for encryption/decryption of large amounts of data, while the public-key algorithms are used merely to encrypt the symmetric keys. Similarly, it is not usually practical to use public-key signature algorithms to sign large messages. Instead, a hash may be made of the message and the hash value may be signed. Methods of asymmetric and symmetric keys that may be used to transfer encrypted data in the present invention are described co-pending U.S. patent application Ser. No. 09/732,650, filed Dec. 7, 2000 by Nguyen et al. and entitled, "Secured Virtual Network in a Gaming Environment," which is incorporated herein in its entirety and for all purposes.

A private key of a public-private signature key pair may also be used to sign a message. The signature may be used for authenticating the message. When the private signature key is used to sign a message, then the public signature key must be used to validate the signature. The Digital Signature Standard (DSS) authorized by the U.S. government uses a private signature key, a public encryption key and a secure hash algorithm for generating and authenticating electronic signatures. For example, to send someone a digitally signed message, the message is signed with a private signature key, and the receiver of the message may verify the signature by using the public signature key corresponding to the private signature key. Prior to beginning a secure data transfer, a site controller and central system 520 may have exchanged public encryption keys or public signature keys and other security information that may be used to establish the identity of the sender of a message to central system 520 and to identify messages sent from central system 520. Details of exchanging encryption keys in a secure manner that may be applied to the present invention are described in U.S. Pat. No. 6,394,907 by Rowe et al., filed Nov. 16, 2001 and entitled "A Cashless Transaction Clearinghouse," which is incorporated herein by reference in its entirety and for all purposes.

Gaming establishment 501 is a casino in this example. However, gaming establishments 501 and 515 could be any type of controlled gaming establishments that are configured to participate in networked gaming, such as casinos, Internet casinos, etc. Gaming establishments 501 and 515 may have the same owner or different owners.

Gaming establishment 501 includes many of the features of gaming establishment 450 of FIG. 4B, including gaming machines 502, DCU 524, translator 525, host server 528, cashless system server 544, WAP device 546 and progressive system server 547. Depending on the embodiment, there may be a single DCU 524 or multiple DCUs. Similarly, there may be one or more translators 525, according to the details of the implementation. Gaming establishment 501 may include one or more devices that are dedicated to wide area bonusing services.

In the embodiment shown in FIG. 5, each gaming establishment includes a network device that acts as a site controller for interacting with central system 520 to provide services according to some methods of the present invention, such as gaming account management services. The site controller may also be configured to provide other services, such as progressive jackpot services. In one such implementation, example, host server 528 is configured to act as a site controller for gaming establishment 501. In another implementation, cashless system server 544 is a site controller for gaming establishment 501. Many of the functions involved in providing gaming account management services can be provided (at least in part) by either the site controller or the central system, or by a combination of both.

In this example, gateway 550 is a network device with network address translation ("NAT") and firewall capabilities that can support multiple devices of gaming establishment 501 with a single external IP address. Gateway 555 provides NAT and firewall capabilities for central system 520. Internet service providers ("ISPs," which are not shown in FIG. 5) provide access to network 525 for gaming establishments 501 and 515, home network 505, financial institution 510 and central system 520.

According to some aspects of the present invention, gaming account management is implemented, at least in part, by authorizing electronic fund transfers to and/or from one or more financial institutions. Therefore, FIG. 5 includes a schematic representation of one such financial institution. Financial institution 510 includes server 514 configured for communication with network 525 and storage devices 511. Here, storage devices 511 are used, inter alia, to store financial account information. In this example, financial institution 510 is a bank and therefore the financial account information includes bank account information, including information regarding accounts maintained by players at financial institution 510. However, player accounts at other financial institutions, such as credit card companies, credit unions, etc., may be accessed according to the methods of the present invention.

It will be appreciated by those of skill in the art that the network shown for financial institution 510 is purely illustrative, in that more or fewer network devices and/or storage devices may be used in a particular financial institution. Moreover, a financial institution network will typically include many other devices, such as host computers, printers, etc.

Home network 505 includes a host device (here, a laptop computer) configured for communication with network 525. Host device 508 includes installed software, firmware or hardware for implementing, in part, some methods of the present invention. For example, host device may include a logic device configured to control a display to indicate gaming account management information. In this example, host device 508 also includes software for enabling Internet gaming.

Home network 505 may or may not include a player authentication device. In some embodiments of the present invention, home network 505 includes a discrete player authentication unit interconnected as a peripheral device for host device 508. The player authentication unit may be used as described elsewhere in this disclosure, e.g. as described with reference to FIGS. 1 and 4A, above. In alternative implementations, home network 505 includes no player authentication device. A player may, for example, input identification information (e.g., a password) via a keyboard or a similar input device. The identification information may correspond with a player's gaming account and/or player tracking account.

According to some implementations of the invention, home network 505 is configured to enable printer 507 to print documents such as gaming account statements, promotional tickets, coupons or the like. Moreover, printer 507 may include a scanner for scanning cashless gaming instruments. In some implementations of the invention, a scanned image of a cashless gaming instrument is used much in the same way that the information on a cashless gaming instrument is read and used by a gaming machine. The image is sent to central system 520 for evaluation (e.g., to determine whether the cashless gaming instrument is valid and has not already been used) and is preferably stored in a storage device for future reference. If the central system approves the image, the player is credited by the value of the cashless gaming instrument and this credit may be used for game play.

In this example, central system 520 includes multiple network devices 560 and storage devices 565. The number of network and storage devices shown is purely exemplary. Here, central system 520 includes gaming account management server 570 for providing at least some gaming account management services according to the present invention. Gaming account management server 570 can access information in storage devices 565, including gaming account information.

In some implementations, at least some of network devices 560 are configured to provide the functionality of an Internet casino. The same network device may be used to provide multiple services, e.g., Internet gaming and gaming account management services. Here, central bonusing server 580 controls a bonusing system for all participating gaming devices and gaming establishments. Similarly, central progressive server 585 controls a progressive jackpot system for all participating gaming devices and gaming establishments.

Central system 520 may provide additional services, including but not limited to cashless services, loyalty program services, auditing services, entertainment content services, communication services, gaming software services, prize services, etc. In some implementations, individual network devices may provide some or all of such services, whereas in other embodiments separate network devices, storage devices, etc., may be dedicated to providing such services.

The cashless services provided by central system 520 preferably include services for implementing the methods of the present invention. As noted elsewhere herein, some such services relate to providing gaming account information and gaming account management services such as cashless instrument services, electronic fund transfers, clearinghouse services, player and/or account identification services, etc. In the process of providing such services, one ore more network devices of central system 520 may provide some or all of the functionality of clearinghouse server 136 described in U.S. Pat. No. 6,394,907 by Rowe et al., filed Nov. 16, 2001 and entitled "A Cashless Transaction Clearinghouse," which is incorporated herein by reference for all purposes.

Loyalty program services may include services and information related to the accumulation of player tracking points and the validation of player tracking points for services and prizes. Auditing/accounting services may include services and information relating to player identity, tracking the performance of different gaming activities, etc.

Entertainment content services may include information and services related to streaming video feeds and audio feeds to a client device of, for example, sporting events. Communications services may include information and services related to peer-to-peer communications between various devices in central system 520 and outside of central system 520, such as text messaging, voice communications, video feeds, e-mail, paging and locator services.

Gaming software services may include devices configured for downloading software to gaming devices. For instance, a game server may provide gaming software and gaming licenses used to play different games of chance on gaming devices. Further, the game server may be used to provide software upgrades and "bug" fixes for the gaming software. U.S. Pat. No. 6,645,077, which is hereby incorporated by reference, provides examples of such software services.

The prize services may include providing combinations of cash and non-cash prizes for awards on the client devices 110 and methods for redeeming the non-cash prizes. Progressive game services may be related to providing progressive jackpots for games of chance. Details of non-cash prize methods and game services that may be used with the present invention are described in co-pending U.S. application Ser. No. 09/515,717, filed on Feb. 29, 2000, by Nguyen, and entitled "Name Your Prize Game Playing Methodology," which is incorporated herein in its entirety and for all purposes.

The present invention provides methods and devices for managing gaming accounts. In preferred implementations, the gaming account management methods are automated. However, implementations that involve human input and/or intervention (e.g., for the identification process) are also within the scope of the invention.

According to some gaming account management implementations of the invention, gaming accounts are stored in a centralized database. In some such implementations, both traditional cashless gaming instrument data (such as ticket number, amount, date/time, casino and machine ID) and new data for implementing the present invention (e.g., relating to player identification) are stored in the database. Using a centralized database allows a player to use credits from various cashless gaming instruments at participating gaming establishments and/or to cash out at participating gaming establishments and/or at home. For example, a person who has played at 5 participating casinos on the Las Vegas strip and has received 5 separate cashless gaming instruments could consolidate some or all of the tickets in a single transaction, e.g., a cash out transaction.

Figure 6A:
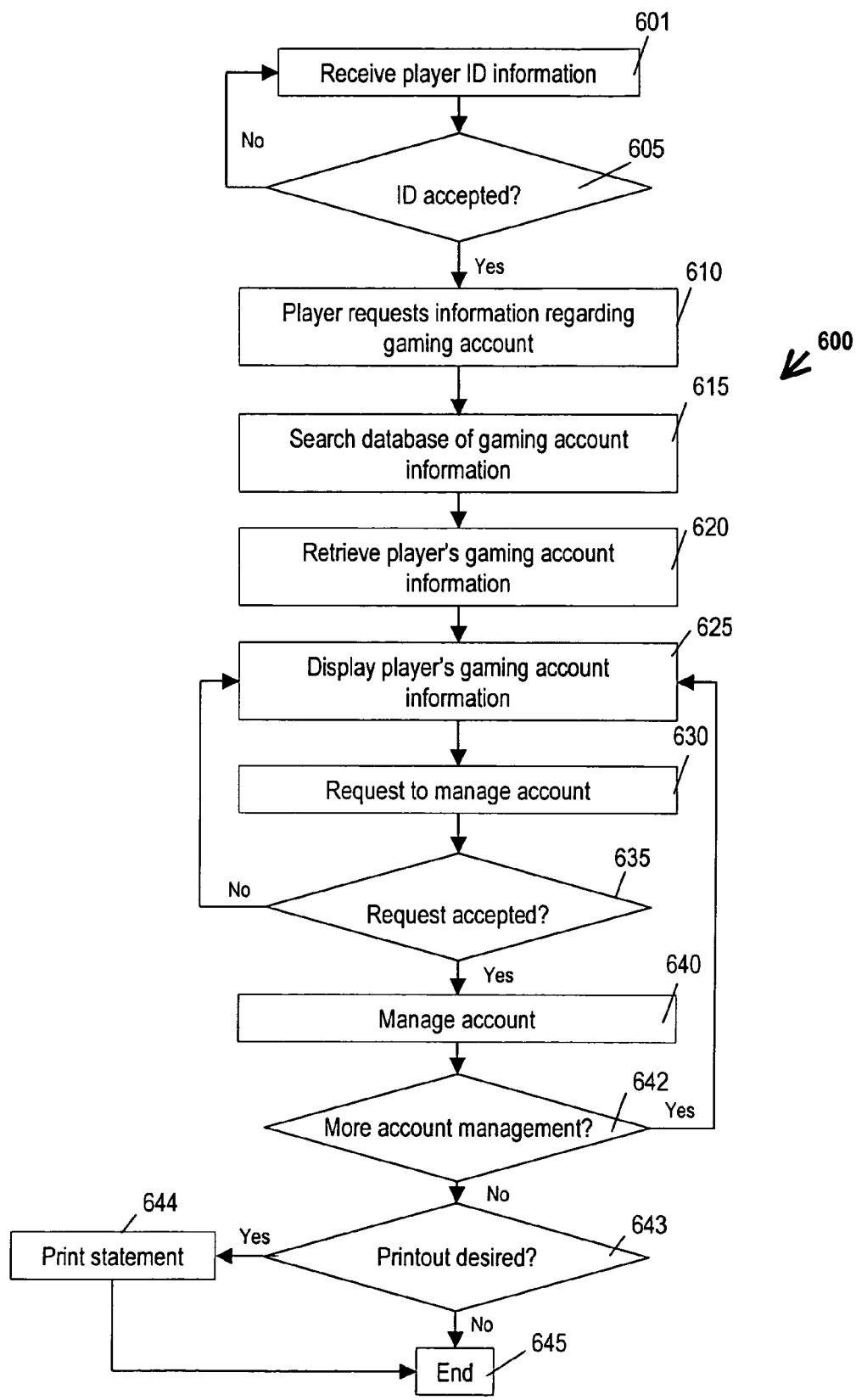
FIG. 6A is a flow chart that outlines some methods of gaming account management according to the present invention.
Figure 6B:
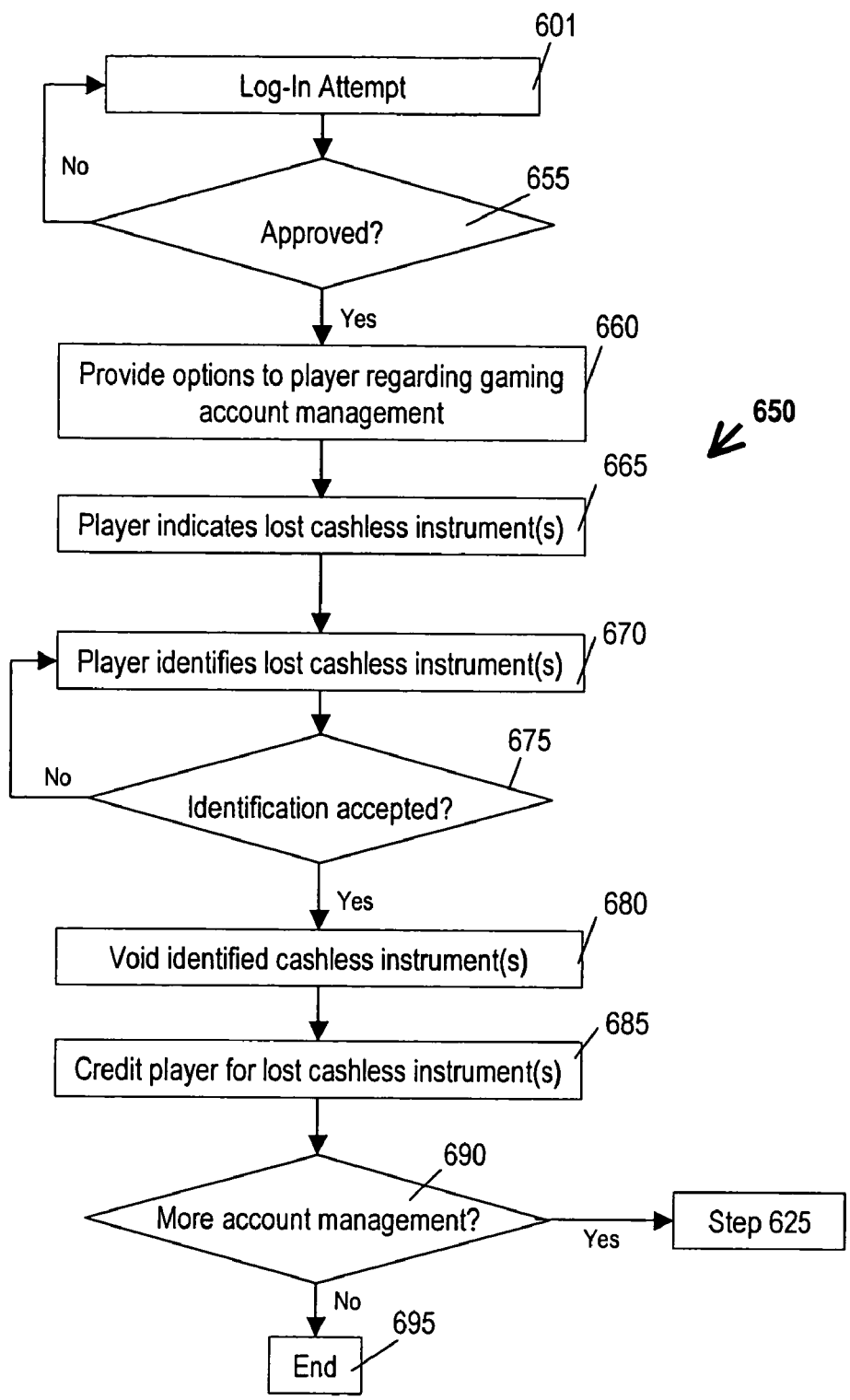
FIG. 6B is a flow chart that outlines one method of gaming account management according to the present invention.

One such gaming account management method is outlined in the flow chart of FIG. 6A. In step 601, a player submits identification information and (optionally) provides gaming account identification information. A player may submit the identification information via a gaming machine, a personal computer, a handheld device or any other convenient device. U.S. patent application Ser. No. 6,682,421, entitled "Wireless Gaming Environment," is hereby incorporated by reference for all purposes. Although the person may not actually be playing a gaming machine or a similar device while using the methods of the present invention, such a person may still be referred to herein as a "player."

According to some implementations, both the player and the gaming account are identified according to the same identification information. In some implementations, the identification information includes biometric information such as a fingerprint or retinal scan, a voice recognition process, etc. In other implementations, the identification information includes a code or password, correct responses to questions posed to the player (e.g., mother's maiden name, place of birth, etc.), or any other convenient identification information.

As noted elsewhere herein, some implementations of the invention allow the player to remain anonymous in the sense that the player's name, etc., does not need to be disclosed during the identification process or recorded by the gaming account management system. The player need only be "identified" in the sense that the player needs to establish himself or herself as a player authorized to access a particular gaming account. In other words, all that is necessary is that a particular player is associated with a particular gaming account.

Some implementations of the invention provide for different levels of access to a gaming account depending on, e.g., the device used to access the gaming account. For example, the methods may only present options that are supportable by the device that was used to access the gaming account. For implementations that allow more than one player to access a gaming account, the level of permitted gaming account management may depend upon the identity of the person accessing the gaming account. For example, some players may only have the authority to view account information but not to manage the gaming account. Alternatively, some players may have access to only certain types of gaming account information, e.g., an account balance, but not to gaming account activities.

In step 605, it is determined whether the identification information is accepted. In implementations wherein player identification information is recorded on a smart card or other cashless gaming instrument, step 605 may include the step of matching the player identification information on the cashless gaming instrument with other player identification information. In one such example, identification information (e.g., biometric information) was previously obtained from the player and was encoded on the cashless gaming instrument, preferably in a format that is not readable by a human being (e.g., a bar code or an RFID tag). In this example, steps 601 and 605 could include the steps of reading the identification information on the cashless gaming instrument, obtaining identification information from the player and comparing the identification information on the cashless gaming instrument with the identification information obtained from the player. The identification information on the cashless gaming instrument and the identification information obtained from the player may or may not be identical.

However, in some implementations of the invention, no cashless gaming instrument is necessary. In such implementations, step 601 may only involve identifying the player (e.g., as described elsewhere herein). In step 605, it is determined whether there is an association between the player's identification information and gaming account information. The gaming account information may be, for example, stored in a lookup table (e.g., of identification information and corresponding gaming account information), a database of gaming account information and identification information, etc. The lookup table and/or database may be accessible to a network device in a gaming establishment, a central system, etc. In one such implementation, the gaming account information is stored in one of storage devices 565 of central system 520.

In other implementations, the gaming account information and identification information are stored in a particular gaming establishment. For example, the gaming account information and identification information may be stored in a storage device accessible by host server 528 and/or cashless system server 544 of gaming establishment 501. For the purposes of performing steps 601 and 605, the gaming account information and identification information need only be sufficient to make a correspondence between a gaming account and one or more authorized persons who may access the account.

If the identification information is satisfactory, the method proceeds to optional step 610. If not, the player is preferably allowed at least a predetermined number of subsequent identification attempts. According to method 600, the player requests gaming account information in step 610. For example, the player may indicate a date and/or time range and request a summary of account activity. Some implementations allow the player to customize the request, e.g., to request only certain types of gaming account activity. For example, the player could request a report of all cashless gaming instruments that have been issued to the player during a specified period. In alternative implementations, the player need not request gaming account information. Instead, step 610 is omitted and gaming account information is automatically searched and retrieved in steps 615 and 620. Step 605 may include the steps of searching and retrieving gaming account information if the identification information is acceptable.

In step 625, gaming account information is displayed, e.g. on a display screen of a gaming machine, personal computer, handheld device, etc., used by the player to submit identification information and/or make a request for gaming account information. The gaming account information may include account summary information, account activity information, account management options, etc. Some implementations of the invention provide for different levels of information access and gaming account management activities, depending on, for example, the device used to access the gaming account, the identity of the person accessing the gaming account, etc. The information displayed in step 625, for example, may depend upon the identity of the person accessing the account. A player with primary access to the account may have unlimited access to gaming account information, whereas another person may have limited access.

Some aspects of the present invention provide for the retrieval and presentation of cashless gaming instruments as part of the gaming account management methods of the present invention. For example, a player could request that payment document images pertaining to a date range of gaming activity be displayed in step 610 and the images would be displayed in step 625. Some methods and devices for acquiring, storing and displaying such images are described in co-pending U.S. patent application Ser. No.10/898,600, entitled "Electronic Image Acquisition for Gaming Systems" and filed on Jul. 22, 2004, which is hereby incorporated by reference for all purposes.

The player may only desire to receive and/or print out the gaming account information displayed in step 625. If so, the player may indicate that he or she desires a printout in step 643, or may simply end the process (step 645).

However, the player may wish to manage the gaming account. If so, the player enters a gaming account management request in step 630. This request may be for a wide variety of gaming account management functions. For example, the player may have lost a cashless gaming instrument and may wish to replace the cashless gaming instrument (e.g., by printing a new cashless gaming instrument or by crediting the gaming account) and void the lost cashless gaming instrument. Alternatively, the player may wish to "cash out" after game play. The player may wish to cash out by having a cashless gaming instrument printed, by having the gaming account credited, by having an account at a financial institution (e.g., a banking, checking or credit card account) credited. The player may have multiple cashless gaming instruments from one or more gaming establishments and may wish to consolidate all of the cashless gaming instruments, e.g., as a single credit to the gaming account or an account at a financial institution. Other implementations allow for the consolidation of gaming session results on a single cashless gaming instrument, such as a smart card.

As noted above, the request may be accepted or denied (step 635) based, for example, on the identity of the person making the request and/or the device used to make the request. For example if the player requests that a lost cashless gaming instrument be voided and re-printed, the request may be denied if there is no indication that the device used to make the request has an associated printer capable of printing a replacement cashless gaming instrument. Alternatively, the request may be denied if the person making the request lacks the authorization for the requested gaming account management service.

If the request is approved, the requested gaming account management services are performed in step 640. As noted elsewhere herein, such gaming account management services may be performed in a variety of ways according to the requested service and the particular implementation of the invention. For example, if the request was for the redemption and/or consolidation of cashless gaming instruments, this process can be performed at a gaming machine, at a cash out kiosk, at a cashier's cage (with human intervention), etc. In one such example, an anonymous player with one or more EZ-Pay tickets and a personal identification number ("PIN") can redeem the ticket(s) at a kiosk by inserting the ticket(s) into a bill acceptor slot of the kiosk and entering the PIN number (e.g., on a keypad). After verification, the kiosk can provide cash, credit a financial account, etc.

If the player wishes to request more gaming account management services (step 642), options are presented (step 625) and the player may make another request (step 630). Preferably, if the device used by the player has an associated printer, the player is offered the option of having gaming account information printed out (step 643). The player may or may not choose to print a statement (step 644) and then the session ends (step 645).

Those of skill in the art will appreciate that the not all steps of method 600 need to be performed in the order indicated in FIG. 6 and that some steps need not be performed at al. For example, a player may wish only to obtain gaming account information or modify the account status, but not both.

As noted above, the present invention encompasses a wide variety of gaming account management services. Some aspects of the invention provide methods and devices for the cancellation/revocation of cashless gaming instruments. One such method 650 is outlined in FIG. 6B.

In step 601, a player attempts to log in to gain access to a gaming account, e.g., as noted above. In step 655, the log-in attempt is approved or denied. Preferably, the player is given at least one additional log-in attempt before method 650 ends. In method 650, if the log-in attempt is approved, the player is presented with gaming account management options in step 660.

In this example, the player has lost a cashless gaming instrument and indicates this condition in step 665. For example, the player may select an option from a graphical user interface presented on a display screen.

In step 670, the player identifies the lost cashless gaming instrument. In some implementations, the player may select the cashless gaming instrument from a displayed account activity statement (or a similar statement). In other implementations, the player may select the cashless gaming instrument from one or more displayed images of cashless gaming instruments.

If the player's identification is accepted, the cashless gaming instrument is voided in step 680 and the player is credited for the lost cashless gaming instrument in step 685. The player may be provided multiple options for obtaining this credit. For example, the player may choose to have the gaming account (or an account at a financial institution) credited, to have credit applied for immediate game play on a gaming machine (or a host machine configured for gaming), etc. Alternatively, the player may choose to have a replacement cashless gaming instrument printed out, if a suitable printer is available.

In step 690, the player is prompted to indicate whether he or she wishes to request other gaming account management services. If so, the process continues to step 625 of FIG. 6A. If not, the method ends (step 695).

Figure 7:
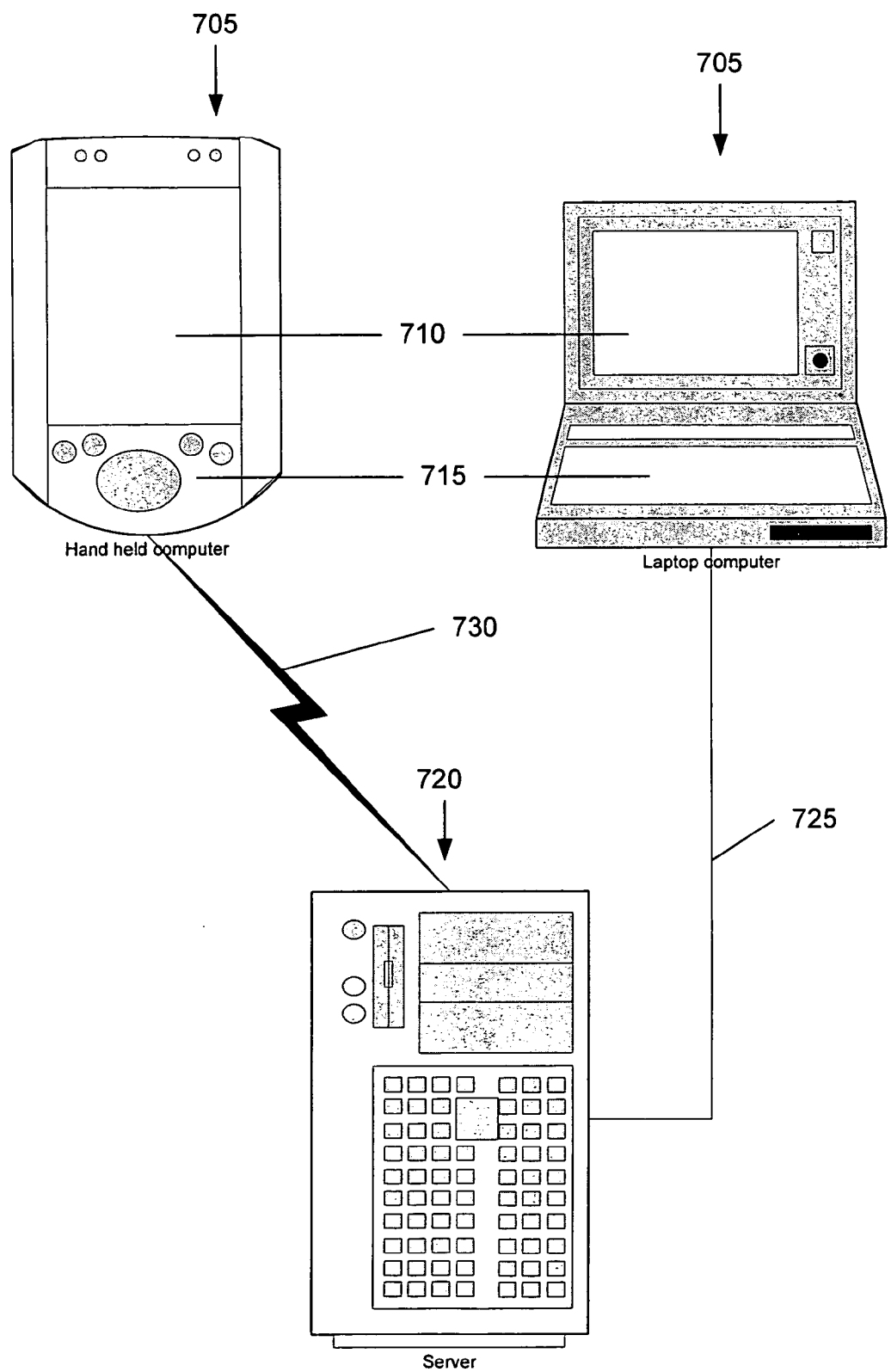
FIG. 7 illustrates alternative devices that may be used for implementing methods for gaming account management according to some aspects of the present invention.

As noted above, gaming machines and host devices that are configured for Internet gaming may be configured to perform gaming account management methods of the present invention. However, the methods of the present invention do not need to be performed by devices that are configured for gaming. FIG. 7 indicates some devices that may be used for gaming account management according to some implementations of the invention. Computer 705 may be any convenient type of computing device, including a desktop computer, a hand held device, a laptop computer, etc. Computer 705 includes a display 710 and an input device such as a keyboard, a mouse pad, or any other input device known in the art. Computer 705 is configured for communication with a host device 720, which has access to a database of electronic representations of payment documents. Computer 705 may communicate with host device 720 by a wired connection 725 or a wireless connection 730. However, computer 705 may or may not include gaming software and/or gaming functionality.

Although the foregoing invention has been described in some detail for purposes of clarity of understanding, it will be apparent that certain changes and modifications may be practiced within the scope of the appended claims. It should be noted that there are many alternative ways of implementing both the process and compositions of the present invention. For instance, while the gaming machines of this invention have been depicted as having a top box mounted on top of the main gaming machine cabinet, the use of gaming devices in accordance with this invention is not so limited. In addition, some implementations of the invention associate a personal identification number with a cashless gaming instrument and/or with a gaming account. Some such implementations associate an identification number with the cashless gaming instrument and allow a gaming account user to, e.g., identify a lost cashless gaming instrument by the identification number. The lost ticket can then be replaced, have its value consolidated with one or more other cashless gaming instruments, etc. Further, while several player authentication data acquisition techniques have been described above, it should be understood that any data acquisition method suitable for acquiring player authentication data and placing it on a cashless instrument so that it may later be read and validated may be used consistent with the principles of this invention.

Moreover, in some implementations, unique transaction information including casino identification information is associated with cashless gaming instruments. For example, such information may be printed on vouchers/tickets that are issued by a gaming machine. Such information facilitates the redemption of cashless gaming instruments, e.g., by devices operated by other casinos through a clearinghouse. Some such implementations create an unique hashed identification number by applying a hashing operation to, e.g., (casino ID+ticket number+transaction ID+player ID+time/date+transaction amount).

Accordingly, the present embodiments are to be considered as illustrative and not restrictive, and the invention is not to be limited to the details given herein, but may be modified within the scope and equivalents of the appended claims.

The invention claimed is:

1. A method for providing gaming account services, the method comprising:
   receiving identification information;
   determining whether a gaming account is associated with the identification information;
   providing gaming account information to a player when a gaming account is associated with the identification information, the gaming account information pertaining to a plurality of ticket vouchers used as cashless gaming instruments, said ticket vouchers being adapted or configured to be negotiated only in connection with the gaming account associated with the identification information; and
   enabling gaming account management options to said player relating to the management of at least one of said previously issued ticket vouchers used as a cashless gaming instrument, wherein said options comprise an option of voiding by the player on a device an unredeemed previously issued ticket voucher.

2. The method of claim 1, wherein the gaming account management options comprise an option of replacing an unredeemed previously issued ticket voucher.

3. The method of claim 1, wherein the gaming account management options comprise an option of consolidating gaming account transactions.

4. The method of claim 1, wherein the gaming account management options comprise an option of consolidating a plurality of said ticket vouchers.

5. The method of claim 1, wherein the providing step comprises providing a gaming account summary.

6. The method of claim 1, wherein the receiving step comprises receiving biometric identification information.

7. The method of claim 1, wherein the receiving step comprises receiving casino identification information.

8. The method of claim 1, wherein the identification information comprises a password and wherein the receiving step comprises receiving the password.

9. The method of claim 1, wherein the determining step comprises accessing a lookup table that comprises gaming account information and identification information.

10. The method of claim 1, wherein the determining step comprises accessing a database comprising gaming account information and identification information.

11. The method of claim 1, wherein the gaming account information provided in the providing step depends on a device from which the identification information was received in the receiving step.

12. The method of claim 1, wherein the gaming account information provided in the providing step depends on a person from which the identification information was received in the receiving step.

13. The method of claim 1, wherein the step of enabling gaming account management options is performed by a first gaming establishment and wherein at least one ticket voucher of the plurality of ticket vouchers was issued by a second gaming establishment.

14. The method of claim 2, wherein the option of replacing said unredeemed ticket voucher comprises an option of crediting the gaming account for a value of the ticket voucher.

15. The method of claim 2, wherein the option of replacing said unredeemed ticket voucher comprises an option of printing a replacement ticket voucher.

16. The method of claim 4, wherein a first ticket voucher of the plurality of ticket vouchers was issued at a first gaming establishment and a second ticket voucher of the plurality of ticket vouchers was issued at a second gaming establishment.

17. The method of claim 5, wherein the gaming account summary comprises information regarding recent gaming account transactions.

18. The method of claim 5, wherein the gaming account summary comprises information regarding gaming account activity during a specified time.

19. The method of claim 13, wherein the step of enabling gaming account management options comprises a step of redeeming at least one ticket voucher that was issued by the second gaming establishment.

20. An apparatus for providing gaming account services, the apparatus comprising:
   an input device configured to receive identification information from a player;
   a player authentication unit configured to determine whether a gaming account is associated with the identification information;
   a display device;
   a communication interface and logic device configured to provide gaming account information to a player when a gaming account is associated with the identification information, the gaming account information pertaining to a plurality of ticket vouchers used as cashless gaming instruments, said ticket vouchers being adapted or configured to be negotiated only in connection with the gaming account associated with the identification information; and to enable gaming account management options to said player relating to the management of at least one of said previously issued ticket vouchers used as a cashless gaming instrument, wherein said options comprise an option of voiding by the player on the apparatus an unredeemed previously issued ticket voucher.

21. A computer program embodied in a machine-readable medium, the computer program comprising instructions for controlling at least one device to perform the following steps:

receiving identification information;

determining whether a gaming account is associated with the identification information;

providing gaming account information to a player when a gaming account is associated with the identification information, the gaming account information pertaining to a plurality of ticket vouchers used as cashless gaming instruments, said ticket vouchers adapted or configured to be negotiated only in connection with the gaming account associated with the identification information; and enabling gaming account management options to said player relating to the management of at least one of said previously issued ticket vouchers used as a cashless gaming instrument, wherein said options comprise an option of voiding by said player on a device an unredeemed previously issued ticket voucher.

22. The computer program of claim 21, wherein the identification information comprises casino identification information.

* * * * *